United States Patent [19]

Brown

[11] Patent Number: 4,646,016

[45] Date of Patent: Feb. 24, 1987

[54] COMPUTER-LINKED NUCLEAR MAGNETIC LOGGING TOOL AND METHOD HAVING A SERIES OF SHAM POLARIZING CYCLES FOR RAPIDLY DISPERSING COMPONENTS OF RESIDUAL POLARIZATION ASSOCIATED WITH A PRIOR-IN-TIME NML COLLECTION CYCLE

[75] Inventor: Robert J. S. Brown, Seal Beach, Calif.

[73] Assignee: Chevron Research Company, San Francisco, Calif.

[21] Appl. No.: 761,128

[22] Filed: Nov. 18, 1985

[51] Int. Cl.$^4$ ............................................. G01R 33/20
[52] U.S. Cl. ..................................... 324/303; 324/311
[58] Field of Search ............... 324/300, 303, 307, 309, 324/310, 311, 312

[56] References Cited

U.S. PATENT DOCUMENTS

| | | | |
|---|---|---|---|
| 3,135,912 | 6/1964 | Baker et al. | 324/303 |
| 3,289,072 | 11/1966 | Schuster | 324/303 |
| 3,402,344 | 9/1968 | Brown et al. | 324/303 |
| 3,617,867 | 11/1971 | Herzog | 324/303 |
| 3,667,035 | 5/1972 | Slichter | 324/303 |
| 4,528,508 | 7/1985 | Vail, III | 324/303 |

Primary Examiner—Michael J. Tokar
Attorney, Agent, or Firm—S. R. LaPaglia; E. J. Keeling; H. D. Messner

[57] ABSTRACT

The present invention decreases the time needed between collection cycles of an NML tool located in a wellbore penetrating an earth formation by zeroing the effect of prior-in-time residual polarization via a surprising change in the operations, viz., using a series of sham polarizing cycles wherein the coil circuit is permitted to ring at the series Q' values higher than the normal Q value. Result: previously non-precessing components of the residual polarization undergo precession and can be subsequently scattered by the next-in-time field. Since all of the sham fields as well as the next-in-time polarizing field are provided with slow-rising amplitude v. time turn-on segments, the precessing components of the polarization existing at the start of the build-up of the fields are easily scattered. Ultimately, all aspects of the residual polarization is destroyed whereby cyclic NML logging speed can be greatly improved.

32 Claims, 19 Drawing Figures

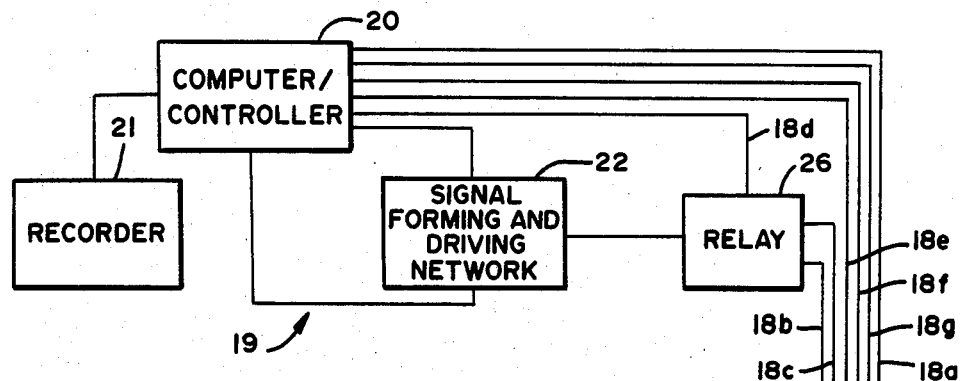
FIG._1.
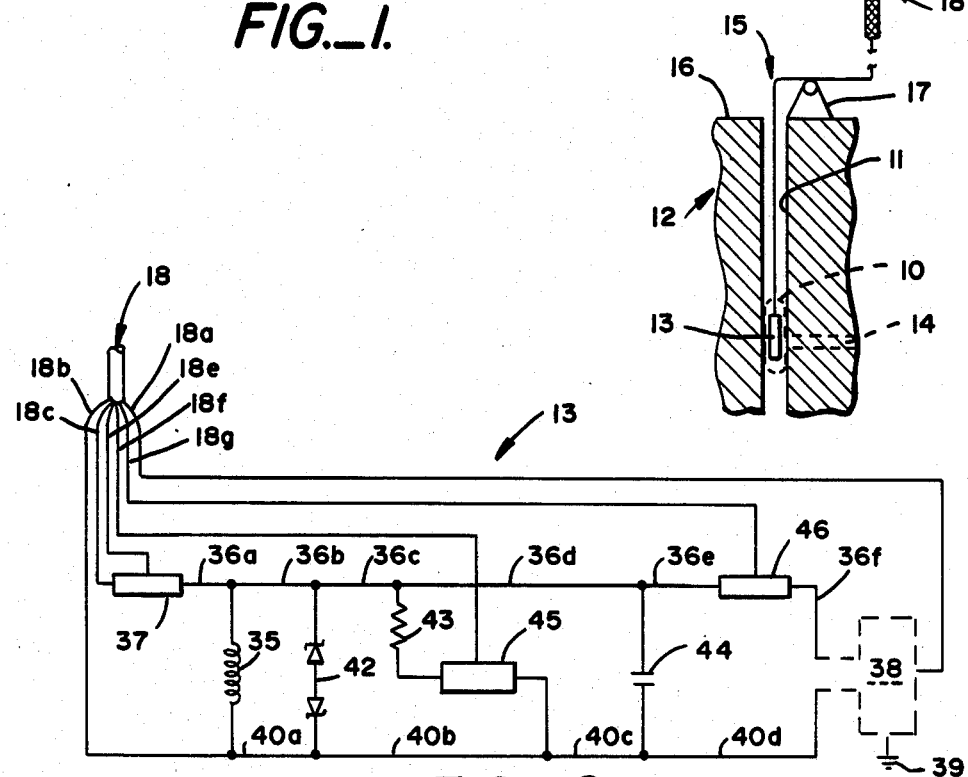
FIG._2.
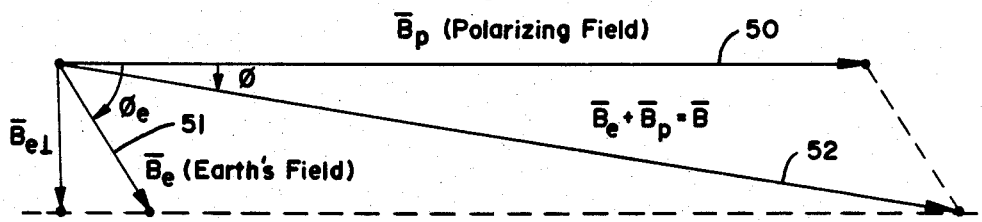
FIG._3.

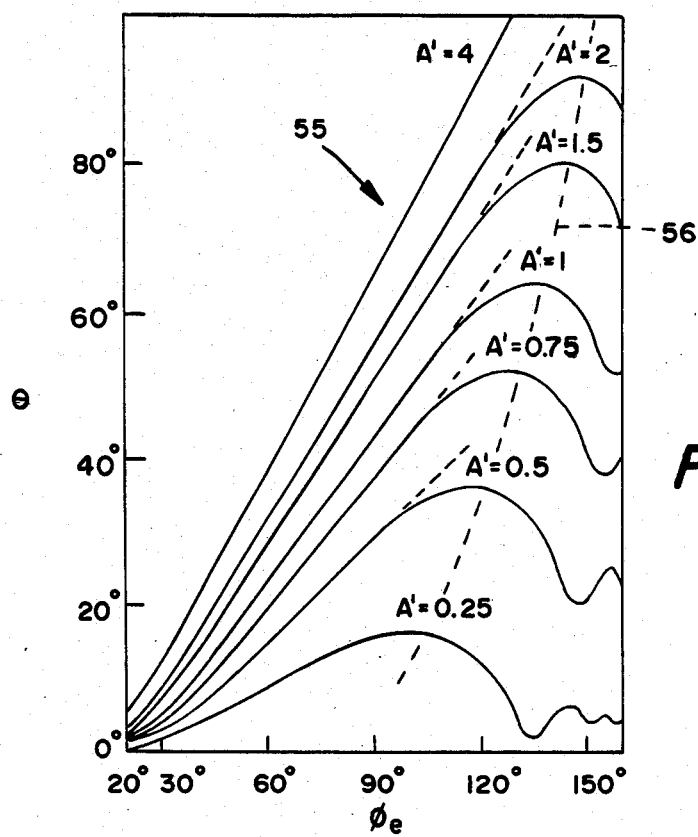
FIG._4.
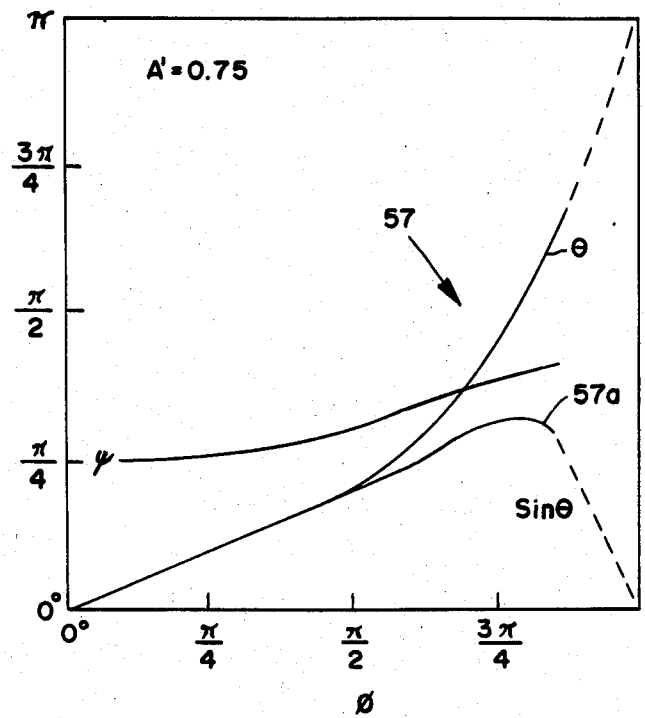
FIG._5.

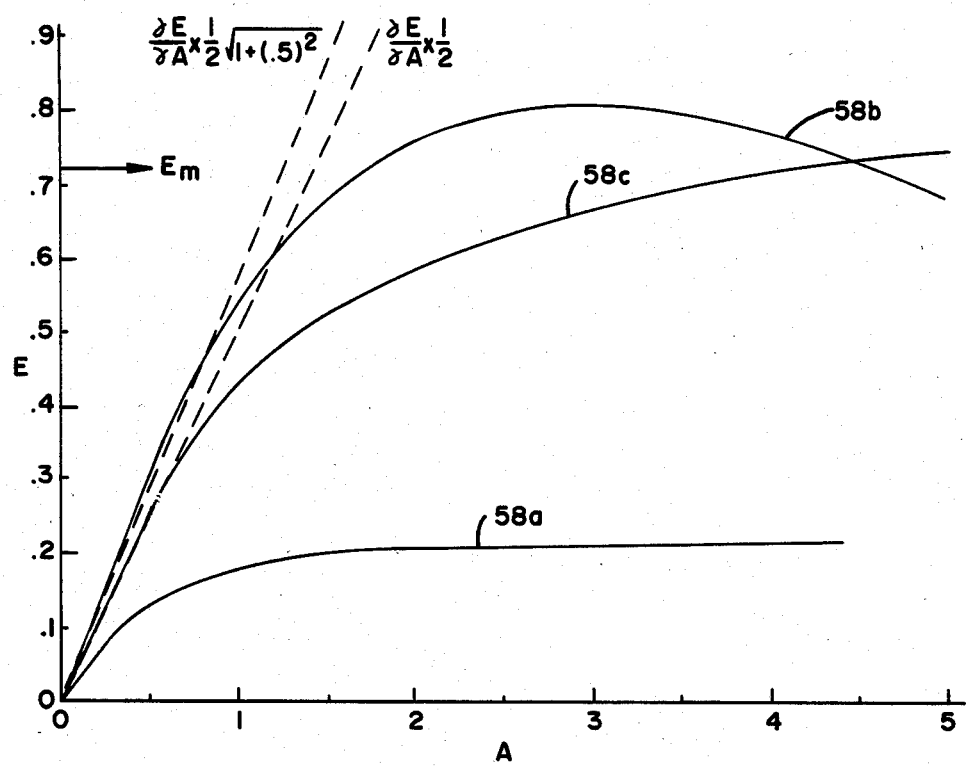
FIG._6.
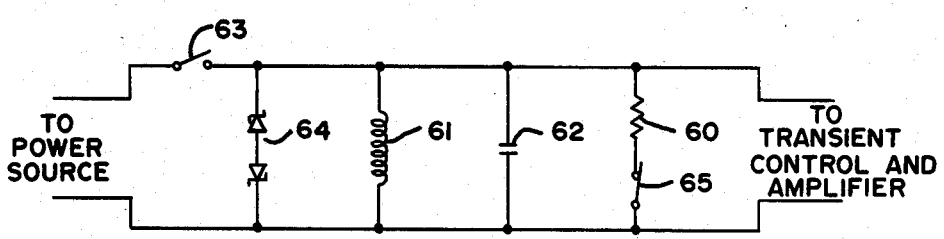
FIG._7.
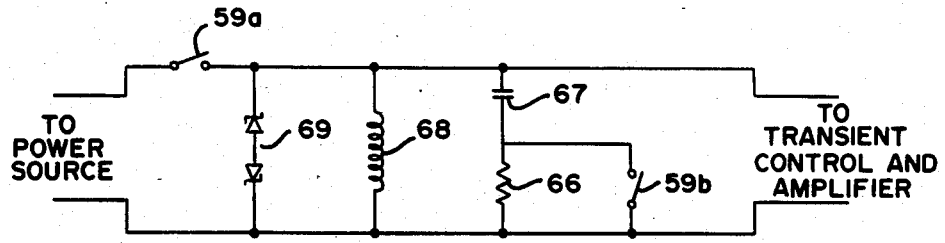
FIG._8.

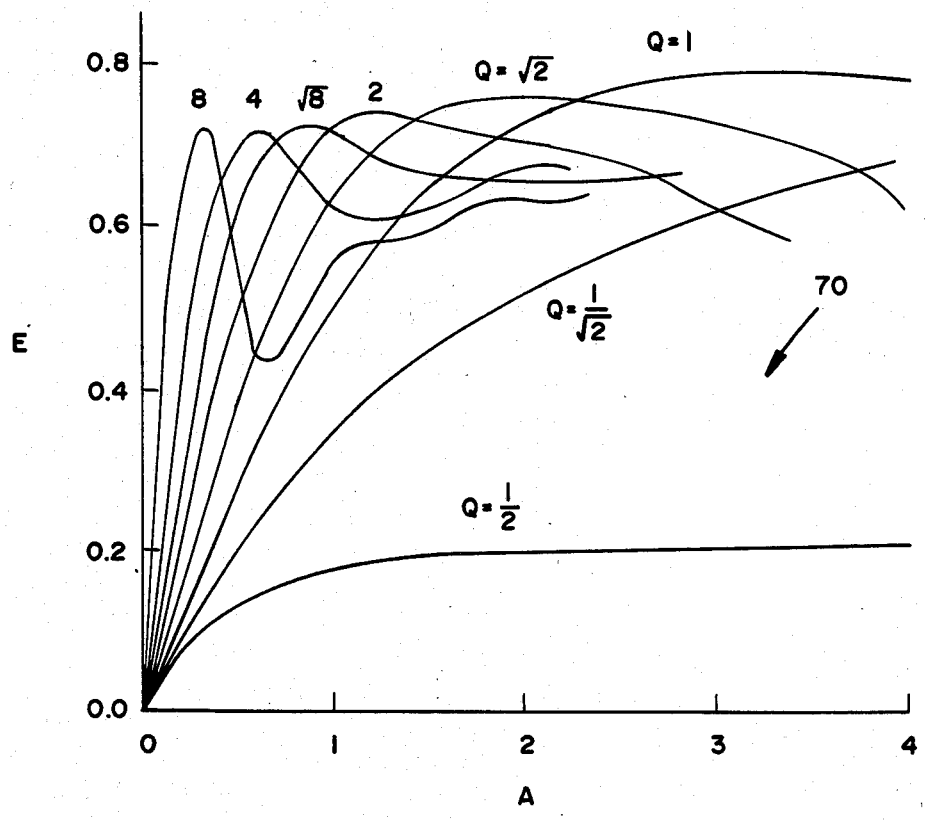
FIG._9.

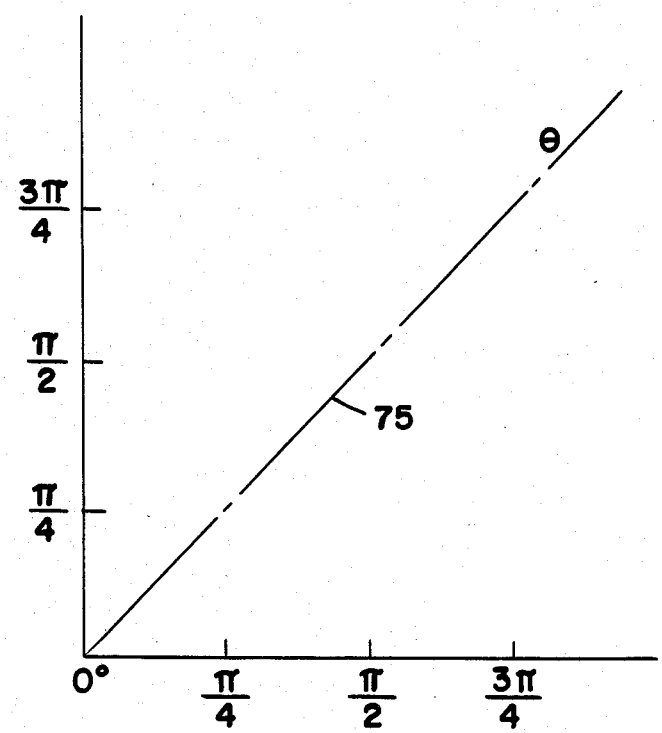
FIG.__10.
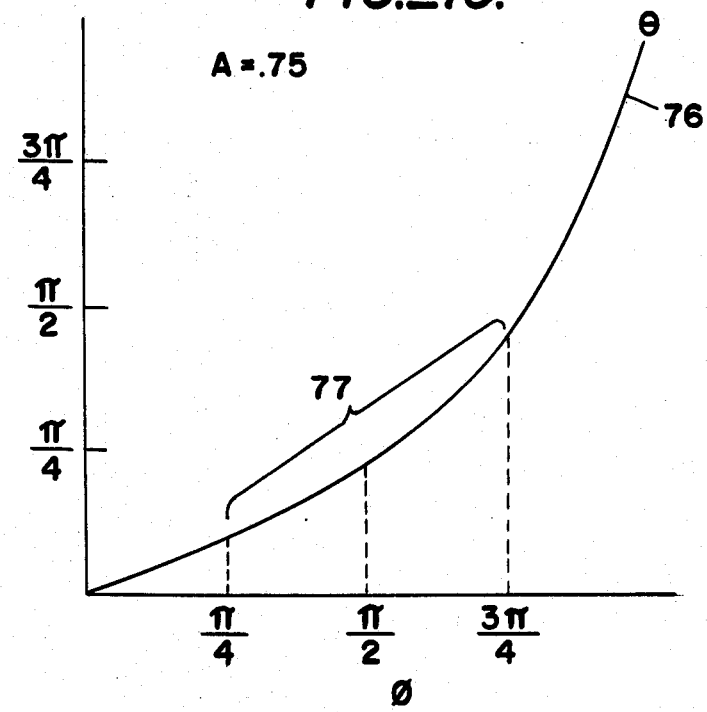
FIG.__11.

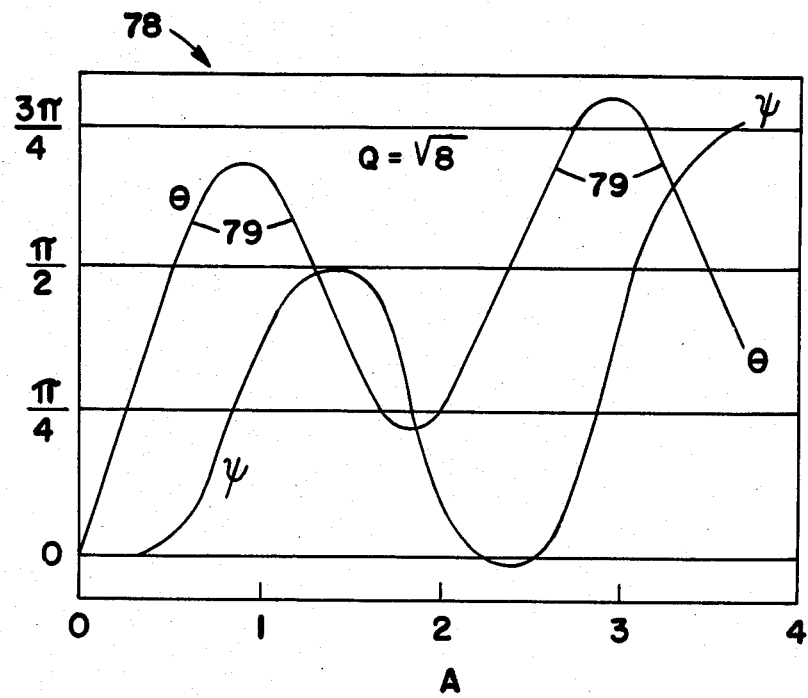
FIG._12.
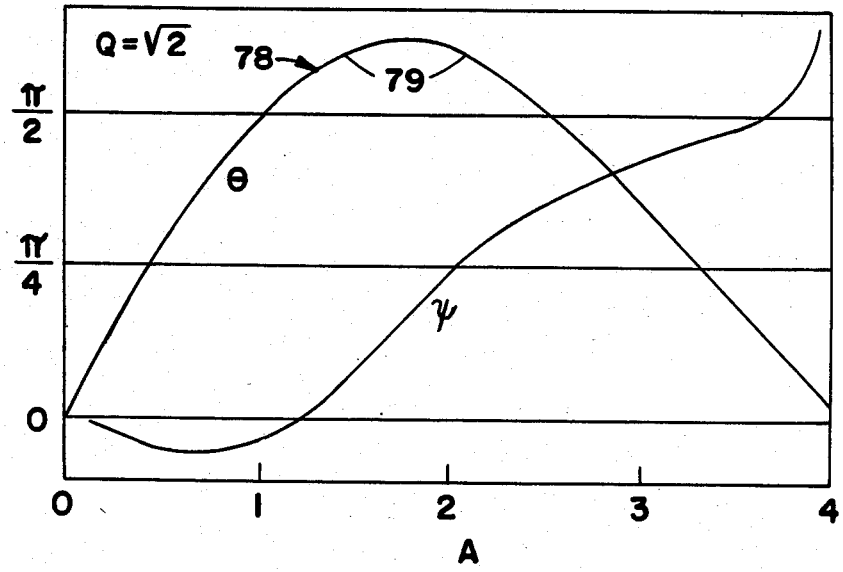
FIG._13.

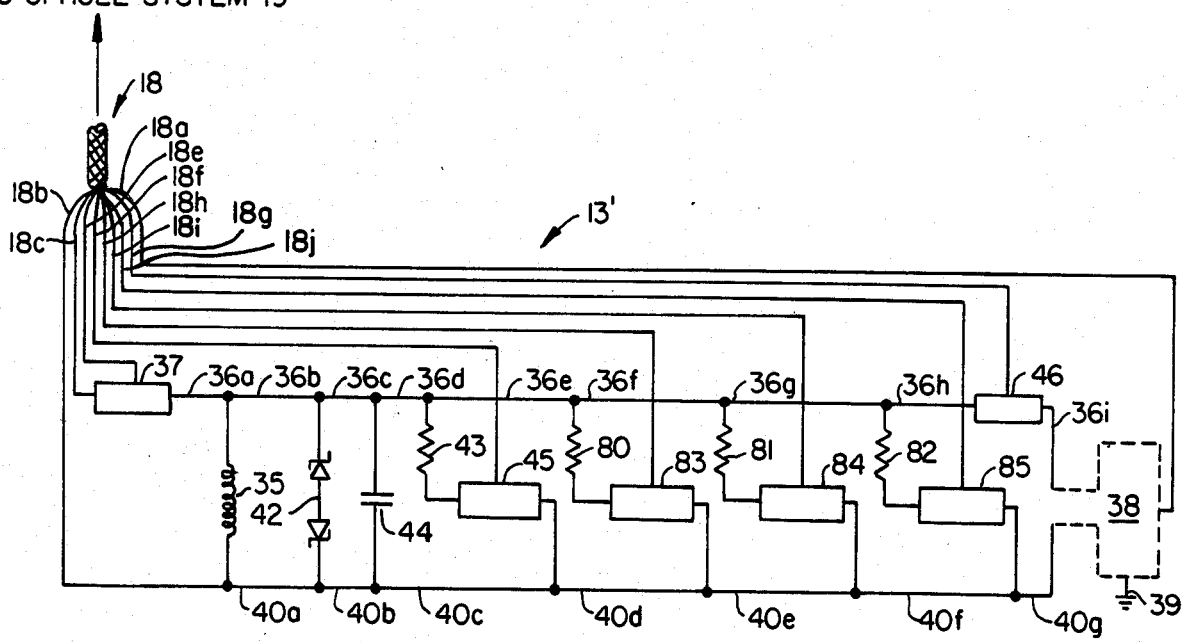
FIG._15.
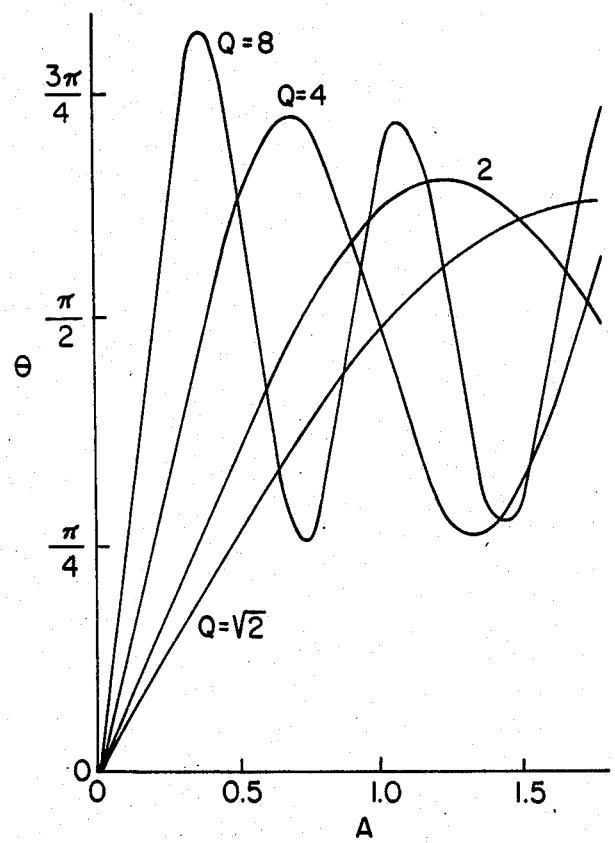
FIG._14.

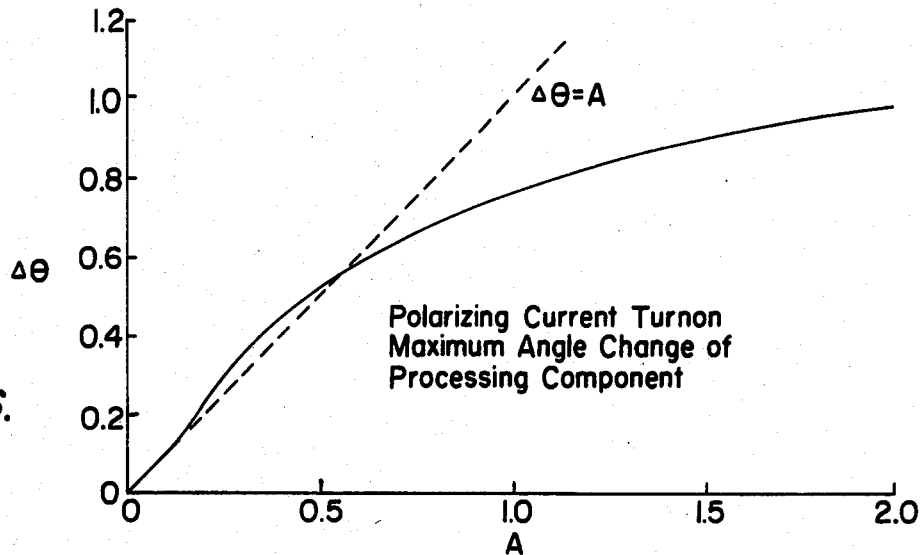
FIG._16.
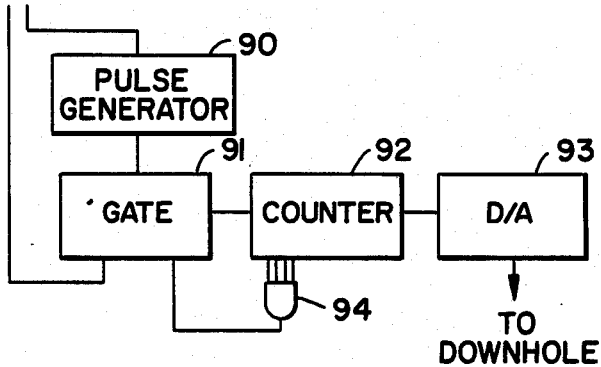
FIG._17.
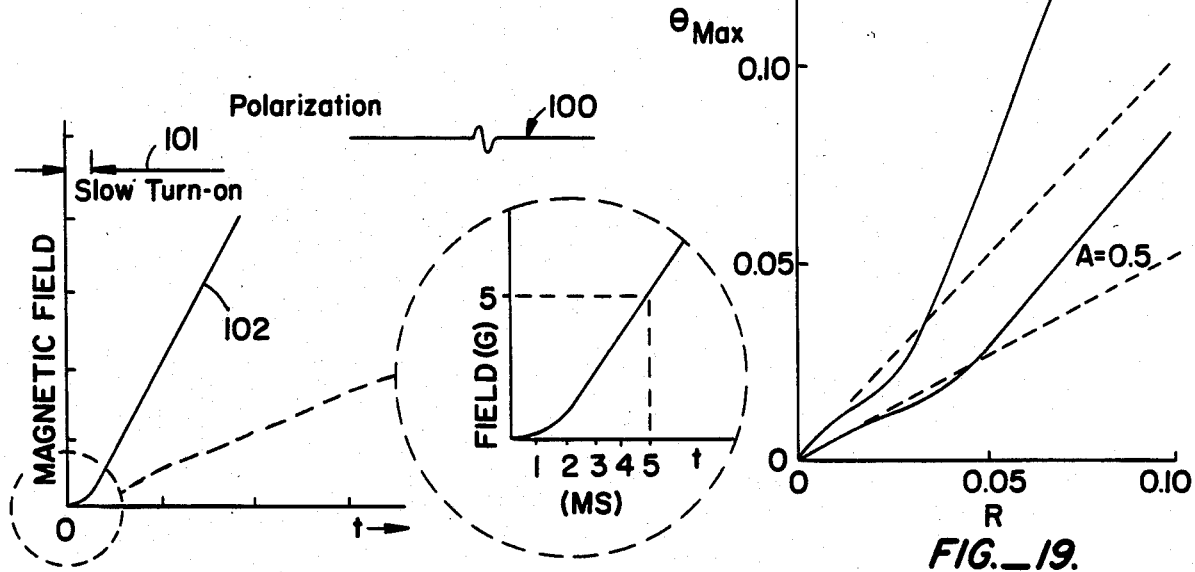
FIG._18.
FIG._19.

COMPUTER-LINKED NUCLEAR MAGNETIC LOGGING TOOL AND METHOD HAVING A SERIES OF SHAM POLARIZING CYCLES FOR RAPIDLY DISPERSING COMPONENTS OF RESIDUAL POLARIZATION ASSOCIATED WITH A PRIOR-IN-TIME NML COLLECTION CYCLE

SCOPE OF THE INVENTION

This invention relates to nuclear magnetic logging methods (hereinafter called NML methods) in which NML proton precessional signals are repetitively collected over a series of detection periods from entrained fluids of an earth formation by means of an NML tool within a wellbore penetrating the formation (viz., detected from hydrogen nuclei over a series of repetitions normalized to a given depth interval).

More particularly, the invention concerns a method of reducing the effect of prior-in-time residual polarization of a set of NML cyclic operations associated with a common depth interval in which at least one of the polarizing periods, of the set, is not long enough to allow such residual polarization to decay by relaxation before the next-in-time collection cycle is to repetitively occur.

The invention is especially useful in NML logging situations in which the next-in-time polarizing period, is not sufficient to bring about decay of the prior-in-time residual polarization by relaxation without insertion of a long depolarizing period between collection cycles. Usual placement of the depolarizing periods: between at least two of the series of normalized collection cycles of descending order and/or of substantial duration. For example, when a collection cycle with a short polarizing period follows a cycle with a long period, a portion of the polarization of the prior-in-time cycle may inadvertently be manipulated by magnetic fields in such a way that the polarization buildup in the next-in-time cycle does not start at zero.

BACKGROUND OF THE INVENTION

Drillers and producers dislike the use of well-scanning tools that disrupt drilling and/or producing operations. They know that with the drill or producing string pulled from a wellbore and a scanning tool in place, many problems can arise.

For example, differential pressure at the contacting surfaces of the tool with the sidewall of the wellbore can generate a positive force as a function of time. As in-hole tool time increases, so does the likelihood of the tool becoming struck. Also, the drilling mud gets stiffer the longer the tool is within the wellbore, and accumulations on the top of the tool also build up. Such effects are complicating factors for clean removal of the tool even if the latter is continuously moving within the confines of the wellbore during data collection. So, the less time a tool is within the wellbore, the better the chances of its successful removal from the wellbore—on time.

In present NML tools, resident in-hole time has been dictated by requirements of the method itself as well as by system circuits for carrying out the method. For example, the NML data must be collected such that the effect of the polarization of the prior-in-time collecting cycle is essentially zero. Hence, either (i) sufficient time must be allowed between collection cycles, or (ii) the next-in-time polarizing period must be sufficiently long to establish maximum polarization of the entrained fluids before the NML data is collected.

Heretofore, commercial NML operations have provided sufficient conditions whereby conditions (i) and (ii) have been met. In the simplest NML mode of operation in which NML data is collected to establish the "free fluid index" of the formation fluids, the polarizing field is applied to the formation a sufficient time period that maximum polarization of the nuclei is established. That time period automatically guarantees that polarization of previous cycles will be at equilibrium before the proton precession signals are detected.

For cyclic NML operations, different steps are needed. A series of different polarizing time and collection time periods are used in association with a common given depth interval of formation (occurring in either $T_1$-continuous or $T_1$-stationary operations). Problems can occur when a cycle with a short polarizing period follows a cycle with a long polarizing period. As a result, polarization built up during the long polarizing period may spill over into the short period and may be manipulated by magnetic fields of the latter in such a way that the polarization buildup of the latter period does not start at zero. Hence, under these circumstances, heretofore a depolarizing time interval was inserted in the cycle of NML operations to allow the residual polarization to decay to equilibrium by relaxation. Such depolarizing time interval is of the order of two seconds. But since the polarizing periods of cyclic NML operations is each only a few tenths of a second and the signal observation intervals each is likewise only a tenth of a second or so, the need for such a long depolarizing period has imposed severe limitations on NML logging speed, say to about 300 feet/hour. It has only been tolerated because of the large time requirements of the uphole computer linked to the NML tool, viz., the time needed by that equipment to reduce the NML data to an acceptable display form. I.e., such reduction (being of the order of two seconds to reduce the observed data to an acceptable display form) has allowed time for the prior residual polarization to decay to equilibrium before the shorter polarization cycle was implemented.

However, now improvements in hardware and software within the associated uphole system at the earth's surface have been proposed by oil field service companies. Goal: to reduce the time frame needed for the computer to reduce the NML data to acceptable form between collection cycles. Such advances encompass hardware, software and/or firmware improvements from individual as well as various combinational forms. However, I have found that advances, the total time required for performing a set of collection cycles of different polarizing periods (even though combined in a collection process that uses the above-mentioned proposed improvements), remains abut the same as previously practiced. Reason: in cyclic NML logging, a 2-second depolarizing period must be used between selected collection cycles to insure that the polarization buildup always begins at zero.) The speed of the logging sonde under these circumstances: about 300 feet/hour.

These limitations also apply regardless of how long the polarizing times are, or how the ratios of the polarizing periods relate one to the other. For example, in reference to the former in practicing $T_1$ continuous logging, even if the polarizing periods of a normalized set were changed to 3200, 800, and 1600 milliseconds, the total time per sequence would still take 6 seconds, even though there is no need to insert depolarization periods between cycles. Or in reference to the latter, instead of polarizing times of the set defining ratios of 4:1:2, different ratios, say 20:1:4 (viz., a set of polarizing times of 2000, 100, and 400 milliseconds with each followed a short signal-observing period) requires about 5 seconds per sequence, since a 2-second time for depolarization must be used after the 2000-millisecond polarizing period. Result: little improvement in logging speed.

Hence, there is now a need to artificially dispose of the effects of prior-in-time polarization within a period substantially shorter than the typical 2-second maximum mentioned above under normal NML cyclic operations and preferably within a period shorter than the present signal-observation time (viz., shorter than above one-tenth of a second). In that way, there would be provided a significant improvement in NML logging speed, e.g., say from 300 to about 600 feet/hour.

Hence, an object of this invention is to provide a method of reducing the effect of residual polarization in cyclic NML operations normalized to a common depth interval whereby such polarization can be reduced to approximately zero within a time period less than the present signal observation time, viz., less than approximately 100 milliseconds. Result: the repetition rate for a series of NML collection cycles normalized to the same depth interval is much improved and logging operations can be carried out at a surprisingly rapid rate.

SUMMARY OF THE INVENTION

In accordance with the present invention, I have discovered that the signal contributions from residual polarization can be manipulated—to reduce the required depolarization period to the above desired range centered at about 0.1 second—without extensive modification of existing circuitry of the NML tool. Heretofore, the NML polarizing and detection circuitry of the tool was tuned to approximately the resonant frequency of the expected NML precession signals in a test tank as well as tuned to maximize enhancements brought about as the coil circuit rings at a selected Q value or quality factor after cutoff. In this aspect, the term "tuning" is used both to describe the altering of the values of circuit elements of the coil circuitry to achieve resonance at a desired frequency in the frequency sense as well as to describe similar changes to achieve enhancmeent of the polarization as the ringing field undergoes damped oscillation as a function of time in the Q-sense.

The present invention has special application in NML operations in which after cutoff of the polarizing field the coil circuit is permitted to ring at the proton precession frequency. That is to say, as the polarizing current is cutoff, the collapse of the polarization field causes an oscillating voltage to be generated in the coil. A large part of this voltage and the resulting current (representing a quantity of energy stored in the polarizing circuitry) is dissipated within the coil circuit. A small part, however, (called "ringing") is permitted to decrease with time and to produce an oscillating resonant magnetic field at the proton precession frequency that propagates outward into the formation and reorients the polarization previously produced. The rate of decay of the ringing is a function of the Q of the circuitry. For any combination of system parameters, including coil configuration, borehole diameter and position of the coil in the borehole, thus a Q of the circuitry exists that produces a maximum NML response after the polarizing field collapses and ringing occurs.

In other words, for a given set of system parameters, there is a Q in which reorientation of the produced polarization is minimally effected—with enhancing advantage—by the magnetic field generated during ringing.

While heretofore the relationship of the collapse of the polarizing field upon the polarizing coil, resulting ringing of the polarizing circuitry and the tuning of the Q of that circuitry for enhancement purposes has been established, I have now discovered that after the Q of the polarizing circuitry has been established, prior-in-time components of residual polarization can be effectively disposed via use of a series of sham polarizing cycles. Each such cycle features a relative short but slow-rising sham polarizing field; abrupt cut-off at a value that is a small fraction of normal polarization; followed by ringing at one of a series of $Q'$ values, higher than that used for normal NML signal production. Result: a combined effect wherein (i) previously precessing components of residual polarization are scattered (due to the slow-rising segment of the sham field) but (ii) previously non-precessing components come under the influence of a series of oscillating magnetic fields generated during ringing at the higher Q's and undergo precession. Components of the residual polarization associated with item (ii), supra, can then be scattered by the subsequent next-in-time, more powerful polarizing field of the NML system of, say in the range of 100 gauss also having a slow-rising, amplitude v. tune turn-on segment.

By the word "slow" in the terms "slow rising" that is description of the build-up of these fields, is meant that the instantaneous angular frequency of rotation of the slowly rising polarizing field (X is much smaller in magnitude than the instantaneous precession frequency) (1) of the precessing components of the residual polarization about that field, i.e., $X \ll 1$. As a result, the components of the residual polarization remain undisturbed in the presence of the field and can follow the directional changes of the latter over the time frame associated with the build-up of each field.

By the term "rise time", it is meant the time required for the leading edge of the polarizing field to rise from zero to several times the strength of the earth's field.

A series of additional resistance elements is preferably disconnectably connected within the polarizing circuitry to increase the Q's of the coil circuit during the series of sham cycles.

In the present invention, the increases in the Q's of the polarizing circuitry during the series of sham cycles are preferably an incrementally increasing factor times the Q value for maximum NML precessional response. Absolute range of the Q's during ringing depends on a number of factors foremost of which is the normalized maximum Q previously established for operations. For example, if the maximum Q has previously been established at about 1, then Q's of the circuitry equal to 2, 4 and 8 provide for the generation of a multiplicity of separate magnetic fields during the sham cycle that assures maximum numbers of precessing components of the residual polarization, as well as scattering of such components as they come under the magnetic influence of the next-in-time sham or full polarizing field. That is to say, in accordance with the present invention, the omission of a previously required depolarizing period results not through cancellation but rather via scattering of the residual polarization wherein the precessing components undergo such rapid increases in precession in the next-in-time polarizing or sham field over such a wide range of frequencies—(phase smearing) that their polarization is effectively scattered as a function of time. Thus, unwanted signal contributions associated with the residual polarization from different parts of the formation are undetectable during the subsequent next-in-time detection period.

However, after the final sham cycle, the Q of the system as seen by the detection circuitry is normally increased for the reception of the NML signal. Such increases still occur in accordance with the present invention. Also, the commercial NML operates with a single coil system for both the polarizing and signal reception operations, but the extension of these descriptions of the invention to a system with separate coil systems for the two functions is quite clear.

In this regard, the present invention increases the Q of the polarizing circuitry during ringing to a higher artificial value in steps during the sham cycles by incrementally changing the value of the resistance element in parallel or series with the tuning condensor. Such changes aid in the surprisingly rapid reduction in the effects due to residual polarization, but does not effect enhancement by the oscillating field on the previously generated nuclear polarizations.

As previously stated, the artificial values of the series of Q's are preferably changed by varying the value of the resistive element in parallel or parallel with the tuning condensor. But since the Q for maximum signal response is also dependent on borehole size and on whether the tool is run centered in the hole or is run close to the borehole wall, increasing Q by steps using such factors are also contemplated.

DESCRIPTION OF THE DRAWINGS

FIG. 1 is a partial schematic of an improved NML system in a well-surveying environment wherein an uphole computer-linked control and signal-generating and recording circuitry is depicted in system contact with nuclear magnetic polarizing and signal detection circuitry positioned within a borehole penetrating an earth formation;

FIG. 2 is a diagram illustrating the polarizing and signal detection circuitry of FIG. 1 in which a damping resistor is disconnectably connected in parallel with a tuning capacitor and with a single polarizing and detection coil;

FIG. 3 is a vector plot of the earth's field ($\bar{B}_e$), the polarizing field ($\bar{B}_p$) and the resultant field ($\bar{B} = \bar{B}_e + \bar{B}_p$) at the start of cutoff of the polarizing current and ringing of the coil of FIG. 2, illustrating the theoretical basis of the present invention;

FIG. 4 is a plot of the angle $\phi_e$ between the earth's field ($\bar{B}_e$) and the polarizing field ($\bar{B}'$) of FIG. 3 and the angle $\theta$ between the polarization M and the resultant field ($\bar{B}$) as a function of different dimensionless parameter values A;

FIG. 5 is a plot of the angle $\phi_e$ as a function of angle wherein phase angle ($\psi$), angle $\theta$ between the polarization $\bar{M}$ and the resultant field ($\bar{B}$) and $\sin\theta$ are plotted to show their interdependence;

FIG. 6 is a plot of cutoff efficiency as a function of dimensionless parameter A for a series of different coil circuits again useful in explaining the theoretical basis of the present invention;

FIG. 7 is a schematic circuit diagram that focuses in more detail on the operation of the coil circuit of FIG. 2;

FIG. 8 is a circuit diagram akin to FIG. 7 illustrating an alternative to the circuitry of FIG. 2;

FIG. 9 is another plot of cutoff efficiency as a function of dimensionless parameter A for a coil circuit having different Q values;

FIGS. 10 and 11 are plots of angle $\theta$ between the polarization (M) and the earth's field ($B_e$) and of angle $\phi$ between the polarizing field ($B_p$) and the resultant field (B) resulting from sudden and more moderate turnoff rates, respectively;

FIGS. 12 and 13 are plots of $\theta$ and $\psi$ as a function of dimensionless parameter A for different values of Q;

FIG. 14 is a plot of $\theta$ versus dimensionless parameter A for still more values of Q;

FIG. 15 is a modification of the polarizing and signal detection circuitry of FIG. 2 in accordance with the present invention;

FIG. 16 is a plot of the change in angle $\Delta\theta$ between the polarization (M) and the earth's field ($B_e$) as a function of various dimensionless parameters A.

FIG. 17 is a detail of the signal-forming and driving network of FIG. 1 illustrating circuit elements for generating the polarizing field of the present invention;

FIG. 18 is an amplitude v. time plot of the polarizing field generated by the signal-forming and driving network of FIG. 12; and FIG. 19 is a plot of the maximum angle $\theta$ between the polarization (M) and the earth's field ($B_e$) as a function of the parameter R for various dimensionless parameters A.

DESCRIPTION OF THE INVENTION

As shown in FIG. 1, a logging sonde 10, shown in phantom line, is positioned within a borehole 11 penetrating an earth formation 12. Within the sonde 10 is polarizing and detection coil circuitry 13. Purpose of circuitry 13: to polarize the adjacent formation 12 and then detect NML precessional signals from hydrogen nuclei of entrained fluids on a cyclic basis normalized a series of depth interval along the borehole 11. A typical depth interval is shown at 14 wherein a series of polarizing periods, followed by shorter detection periods, provide a sequence of NML data associated with a conventional series of collection cycles. Typically, in a $T_1$ collection sequence a set of numbered, different collection cycles (say, 100, 200, 400, 800, 1600 and 3200-millisecond periods) are repeated a number of times (usually about ten times) all normalized to the same depth interval wherein similar resulting data are stacked. But higher precision of the internally stacked data requires more complete disposal of the residual polarization to prevent an incremental gradual build-up of the latter, even though the internal polarizing times are equal. Hence, one or more polarizing periods had to be allowed for within each collection cycle. Thereafter, the resulting NML data is sent uphole via logging cable generally indicated at 15 that includes a strength-aiding elements (not shown) rigidly attached to the sonde 10 (at the uphole end thereof) and rotatably supported at the earth's surface 16 by a support winch 17 that includes a depth sensor (not shown). Cable 15 also includes a series of electrical conductors generally indicated at 18 for aiding in the control and operation of the downhole polarizing and detection circuit 13. For example the series of electrical conductors 18 can include a NML signal transmitting conductor 18a by which the NML data collected downhole can be transmitted uphole for enhancement and recording within a computer-controlled recording system also at the earth's surface 16 and generally indicated at 19. Such computer-controlled recording system 19 includes a computer within computer-controller 20 whereby the resulting NML data can be organized and enhanced to provide meaningful estimates of permeability and porosity of the given depth interval. Results are recorded at recorder 21 as a function of depth interval along the borehole 11 as determined by the depth indicator at winch 17. Also linked to computer-controller 20 is a signal-forming and driving network 22. As explained in more detail below, the network 22 provides a tailored polarizing current each collection cycle that is transmitted downhole to the polarizing and detection circuit 13 within sonde 10, say via a pair of current conductors 18b and 18c shown attached to relay 26 at the output of D/A convertor 25 of signal-forming and driving network 22. Also located at the earth's surface 16 are a series of additional electrical conductors 18d, 18e, 18f, and 18g. These additional conductors connect to computer-controller 20 of the computer-controlled recording system 19 for the purpose of controllably linking various elements, miscellaneous equipment and operations of the present invention at both the earth's surface 16 and downhole within polarizing and detection circuit 13 as explained in more detail below. For example, conductor 18d aids in the control of uphole relay 26 during operations so that after polarization, the signal-forming and driving network 22 is disconnected from the downhole polarizing and detection circuitry 13 for more reliable detection of the precessional NML signal during each collection cycle.

Computer-controller 20 can include improvements in hardware and software within the associated computing system as proposed by oil field service companies. Goal: to reduce the time needed to reduce the NML data to an acceptable display form between collection cycles.

However, even using such advances, the total time required for performing, say, $T_1$ stationary measurements, has remained the same as before practiced due to residual polarization build-up. The speed of the logging sonde 10 under these circumstances: about 300 feet/hour.

FIG. 2 illustrates the polarizing and detection coil circuitry 13 in more detail.

As shown, a polarizing coil 35 is connected uphole to signal-forming and driving network 22 as follows: on one side by conductor segment 36a, switch 37, and uphole conductor 18c, and on the other side by conductor 18b so as to be driven with a polarizing current of predetermined duration. In series with conductor segment 36a are conductor segments 36b, 36c, 36d . . . 36f. These latter conductor segments 36b . . . 36f connect the coil 35 to the active section of signal detection circuit 38 during the detection of the precessional NML signals. The coil 35 is also connected to ground at 39 within detection circuit 38 by means of additional conductor segments 40a, 40b . . . 40d. Between the conductor segments 36b . . . 36f and ground 39 are several circuit elements paralleling the coil 35. Paralleling the coil 35 are Zener diodes 42, a resistance element 43 and a capacitor 44. Switch 45 connects resistance element 43 to ground 39 while switch 46 disconnectably connects conductor segments 36e and 36f. Switches 45 and 46 are controlled by command signals originating uphole and passing thereto via conductors 18f and 18g, respectively, during polarization, cutoff of the polarizing current and ringing of the coil 35 as well as during detection of the precessional NML signals. In addition, during cutoff and ringing, the resistance element 43 and the coil 35 are used to establish damping of the collapsing field as explained in more detail below.

During polarization, uphole relay 26 of FIG. 1 and switches 37, 45, and 46 of FIG. 2 are controlled so that the coil 35 is driven by polarizing current from the uphole circuitry at a maximum level; at the same time, the detection circuitry 38 of the polarizing and detection coil circuitry 13 is protected. Referring to the FIGS. in more detail, the contacts of relay 26 and switch 37 are initially controlled so as to be closed during polarization. In that way, the uphole signal-forming and driving network 22 is contacted directly to the coil 35. At the same time, the contacts of switch 45 and of switch 46 remain open during this period of operations, i.e., remain open with respect to uphole conductors 18b and 18c. As a result, the coil 35 is driven with a maximum polarizing current to generate a strong polarization field oriented at an angle to the earth's field over a predetermined time duration without harming the detection circuit 38. Thereafter, the contacts of the uphole relay 26 and switch 37 are opened as switch 45 is closed and the polarization field of the coil 35 is permitted to collapse. During collapse of the field, a discharge path is initially established through the Zener diodes 42 to ground 39 for the self-induced current within the coil 35 wherein the self-induced voltage across the diodes 42 remains essentially constant for any value of induced current above a selected value for a selected time frame. Of course, the most rapid field decay would be obtained with the coil 35 unloaded, i.e., with a substantially infinite resistance path being placed in parallel with the coil 35. Unfortunately, the magnitude of the voltages induced would destroy not only the coil 35, but also the associated electronics. On the other hand, a low resistance across the coil 35 that would maintain the transient voltage within reasonable limits would make current cutoff too slow for detection of precessional signals.

But in accordance with the present invention because an initial discharge path for self-induced current, as provided by the Zener diodes 42, is followed by generating an enhancing oscillating field by driving the coil with a current inversely proportional to resistor 43 connected in a parallel circuit with the coil 35 but dissipating. Result: enhanced ringing of the coil at the proton precession frequency within a time frame that still allows for timely detection of the precessional signals from fluids within the formation at modest cutoff rates. In this regard, the resistance value of resistor 43 is selected at a value that associates the Q value of the coil circuit as explained in more detail below wherein ringing of the coil (at a higher Q value) is carried out at the frequency of proton precession of the adjacent fluids.

It should be noted in this regard that during damping of the stored energy, that although higher resistance value of the Zener diodes 42 results during fast cutoff, this effect is overshadowed by the value of the resistance element 43 in parallel with tuning capacitor 44 in establishing the higher Q of the coil 35. Such a Q value permits the coil circuit to quickly approach a condition that allows magnetic oscillations or "ringing" to occur as the stored energy is damped for enhancement of the previously generated nuclear polarization as explained below.

After ringing has subsided, switch 46 is closed as switch 45 is opened. This operation connects the coil 35 to the initial stage of the signal and detection circuit 38. During this time frame, the capacitor 44 (with the resistor 43 decoupled) continues to tune the coil 35 to the proton precession frequency of the NML signals to be detected. With the resistor 43 decoupled from the circuit, the Q value of the circuitry is lowered. This occurs even though the Zener diodes 42 are still in the circuit but the latter have no effect, since they appear as an almost infinite resistance to the low voltages of the circuitry. Note, also, that the Q of the coil circuitry can even be changed, if desired, by appropriate operation of the feedback networks associated with the amplifying network of the circuit 38. The theory and description of such networks are discussed in detail in my U.S. Pat. No. 3,204,178 for "AMPLIFIER INPUT CONTROL CIRCUITS", issued Aug. 31, 1965. Such networks provide for reasonably low resistance paths for discharge of the self-induced voltages while the Q of the circuitry is changed to a value compatible with effective reception of the precessional signals.

While general equations of state for polarization during cutoff are available at least for the case of a polarizing field that starts large compared to the earth's field and is then bought linearly to zero (viz., instantaneous cutoff), none have been developed for the case in which a "ringing" oscillating field is used to enhance the previously generated nuclear polarization at the proton precession frequency of fluids to be detected in an adjacent earth formation. Briefly, I have found that allowing the coil 35 to ring at the frequency of proton precession with an appropriate higher Q following cutoff provides for signal detection sensitivity that is only slightly less than that obtained with instantaneous cutoff, but also minimizes the effects of prior-in-time components of residual polarization that were parallel to the earth's field at the start of the polarization period. The basis for this conclusion is set forth below in which a series of key NML terms are developed in conjunction with the definitions set forth below in the Section entitled "SYMBOLS AND DEFINITIONS SECTION", viz.:

Nuclear Magnetization, Dipole Moments Polarization and Relaxation

Hydrogen nuclei of entrained fluids of the earth formation have magnetic dipole moments which produce magnetic fields somewhat like those of tiny magnets. Were it not for the fact that the moments can come within the influence of the polarizing field of coil 35, their fields would be randomly oriented and not produce an observable external magnetic field. But since they are subjected to such field, their associated magnetic fields can become aligned with that field. At the same time, a scrambling effect due to thermal motion is produced. It tends to prevent such alignment. But a slightly preferential alignment (called polarization) occurs. Note that the polarization is proportional to the strength of the polarizing field that causes the alignment but inversely proportional to absolute temperature, the latter being a measure of thermal motion tending to scramble the system of nuclear magnetic moments.

The nuclear polarization produces a magnetic field which can be detected. Note that the polarization does not decay immediately when the field is removed. The process of the approach of the polarization to its new equilibrium value when the magnetic field is changed is called "relaxation" and the corresponding times are called "relaxation times". (Note in this application the term "nuclear magnetization" corresponds exactly to polarization but it is acknowledged that the latter is sometimes referenced as a dimensionless term only.)

PRECESSION

In addition to being little magnets, fluid nuclei are also like little gyroscopes, and can be twisted just as gravity twists a spinning top. Result: The nuclei precess. That is, they precess unless they are aligned with a strong field just as the toy top precesses so long as it is not aligned with the earth's field of gravity.

DETECTION OF PRECESSION

A precessing nuclear polarization produces a rotating magnetic field which in turn generates electric signals which can be detected. Precessional frequencies are directly proportional to the strength of the twist causing the precession, that is to say, it is directly proportional to the strength of applied field, and the precessional frequency is 4.2577 kilohertz per gauss of applied DC field for hydrogen nuclei of interest.

CONDITIONS FOR PRECESSION

Two things must be present to obtain a precessing polarization. First, the polarization must be produced by subjecting the fluids to a polarizing field for an approprite length of time. Second, the polarization and another field must somehow be made not parallel to each other as by reorienting the fields so that the polarization is subjected to a magnetic field in a new direction.

In nuclear magnetism logging, proton precession is caused to take place in the earth's field after the nuclear polarization has been generated in a direction in the borehole at an angle, say preferably 90° to the earth's field when the polarizing field is cut off, the polarization is left to precess about the earth's field.

CUTOFF EFFICIENCY

Consider the case of an idealized two-dimensional dipole, single-coil logging system centered in a borehole. The units used here are intended to be consistent and, for convenience, several quantities will be used in dimensionless form, and certain other conventions will be adopted, as set forth under the "SYMBOL AND DEFINITIONS SECTION" infra. With instantaneous polarizing field cutoff, the signal from a small element of area is proportional to the local value of $\sin^2\phi_e$, the angle between the earth's field ($\bar{B}_e$) and the polarizing field ($\bar{B}_p$) and inversely proportional to the fourth power of l, the distance from the borehole axis. As shown in FIG. 3, $\bar{B}_p$ is the polarizing field, indicated by vector 50, and $\bar{B}_e$ is the earth's field, indicated by 51. A bar or caret over the symbol for a field indicates a vector (with the caret indicating a unit vector), absence of a bar or caret indicates the scalar amplitude, and a dot over a symbol indicates rate of change. Thus, $-\dot{B}_p$ is the rate of reduction of the polarizing field. The rate of increase of $\phi$, the angle between the polarizing field $\bar{B}_p$, and resultant of $\bar{B}_p$ and the earth's field, $\bar{B}_e$ indicated by vector 52, is governed by the ratio $\dot{B}_p/B_e$. If $\dot{B}_p$ is constant during cutoff prior to ringing, if any, the cutoff can be characterized by the dimensionless parameter $$A' = (-\dot{B}_p/B_{e\perp})/\omega_{e\perp} = \dot{B}_p/(\gamma B_{e\perp}^2),\tag{1}$$

where $\omega_{e\perp}$ is the instantaneous precession angular frequency when $\phi=90°$, and $\gamma$ is the magnetogyric ratio. The ratio $-\dot{B}_p/(\gamma B_e^2) = G'$, with $G' = A' \sin^2\phi$, is fixed if the only parameter varied is $\phi$. Much of our discussion will be specialized to the case $\phi=90°$, for which $A'=G'$, i.e., the NML tool is entered in the borehole with axis, of the latter parallel to the earth's field.

In NML, $B_e$ is usually of the order of a half gauss, and $B_p$ at the edge of the borehole, usually over a hundred gauss. The time to turn off $B_p$ is of the order of 10 milliseconds. Thus, G at the edge of the borehole may be of the order of two, and it decreases rapidly with distance into the formation.

The instantaneous rate of cutoff will be characterized by the parameter $$\alpha = \Omega/\omega = A' \sin^3\phi = G' \sin^3\phi/\sin^2\phi_e, \qquad (2)$$

where $\Omega=d\phi/dt$, and $\omega$ is the instantaneous angular frequency of precession about the resultant of the earth's field and the polarizing field. If $\alpha >> 1$, cutoff is fast, and the polarization is nearly left behind as the direction of the resultant field changes. If $\alpha << 1$, the polarization nearly follows. Reference to FIG. 3 shows that for most of the cutoff time, the angle $\phi$ is very small. For instance, if $A'=2$, and $\phi=20°$, Equation 2 gives $\alpha=0.08$. Even for a much higher cutoff rate, the first ten or more degrees of angle change is slow. The rest of the cycle is in the intermediate range, with $\alpha$ comparable to one, unless $\phi_e$ is nearly 180°, in which case the precessing polarization is not coupled to the NML coil to give a signal.

To specify the position of polarization during cutoff, $\theta$ is defined as the angle between the polarization $\overline{M}$ and the resultant field $\overline{B}=\overline{B}_p+\overline{B}_e$, and the phase $\psi$ is specified as the angle about $\overline{B}$ with respect to the plane of $\overline{B}_p$ and $\overline{B}_e$, viz., in the plane of FIG. 3.

With non-instantaneous cutoff, the signal contribution from an element of area is proportional to $\sin \phi_e \sin \theta \, \rho^{-4} e^{i\psi}$, where $\theta$ is the angle between the polarization and the earth's field after cutoff. The coupling to the coil remains proportional to $\sin \phi_e$, and this factor is not affected by cutoff rate. Since a factor of $\sin \theta$ replaces a factor of $\sin \phi_e$, when cutoff is not instantaneous, the factor of $\sin \theta/\sin \phi_e$ is regarded as relevant to cutoff efficiency. Note that this factor can exceed 1.0. The observed signal is the sum of contributions from all elements of area from the borehole wall to infinity, added with proper regard to the phase, $\psi$. The cutoff efficiency is then the absolute value of the signal with the actual mode of polarizing field cutoff divided by the signal with instantaneous cutoff:

$$E = \frac{\int_{\eta=0}^{2\pi} \sin^2\phi_e(\eta) \int_{\rho=a}^{\infty} \rho^{-4}(\sin\theta/\sin\phi_e)e^{i\psi} \rho \, d\rho \, d\eta}{\int_{\eta=0}^{2\pi} \sin^2\phi_e \int_{\rho=a}^{\infty} \rho^{-4} \rho \, d\rho \, d\eta} \qquad (3)$$

where $\eta$ is azimuthal angle around the borehole axis. (Note that the customary symbol, $\phi$, has already been used for something else.) Note also that $\theta$ and $\psi$ depend on $\phi_e$ and $\rho$. For the geometry under consideration, $\phi_e$ does not depend on $\rho$ or A, but may depend on $\eta$. The integrations in the denominator are separable.

The local cutoff rate A is a function of the strength of the polarizing field, which is inversely proportional to the square of $\rho$:

$$A(\rho) = A(a)(a/\rho)^2 \qquad (4)$$

$$dA(\rho) = -2 \, a^2 A(a) \, \rho^{-3} \, d\rho$$

$$\rho^{-4} \rho \, d\rho = -\text{Constant} \times dA(\rho) \qquad (5)$$

In the following, the symbol $A'$ is used to indicate $A(\rho)$ at a general distance into the formation and the symbol A or A(o) is used to indicate A(a), the value of A at the borehole wall.

Substituting (5) into (3)

$$E = \frac{\int_{\eta=0}^{2\pi} \sin^2\phi_e(\eta) \int_{A'=0}^{A} (\sin\theta/\sin\phi_e)e^{i\psi} \rho \, dA \, d\eta}{\int_{\eta=0}^{2\pi} \sin^2\phi_e \int_{A'=0}^{A} dA} \qquad (6)$$

Let the ratio of the A-integrals be $E^*(\eta)$, so that $E^*(\eta)$ is given by $$E^*(\eta) = <\sin \theta e^{i\psi}>/\sin\phi_e \qquad (7)$$

where the brackets $< \; >$ indicate an average with respect to $A'$ over the range from zero to A.

Put (7) into (6)

$$E = |<\sin^2\phi_e \, E^*>|/<\sin^2\phi_e> \qquad (8)$$

where here the $< \; >$ indicate average with respect to $\eta$ over the interval from zero to two $\pi$.

If the earth's field is parallel to the borehole axis, then $\sin \phi_e$ and $E^*$ are no longer functions of $\eta$. Then the cutoff efficiency is simply $$E = |E^*| = |<\sin \theta \, e^{i\psi}>| \qquad (9)$$

Recall that the position of the polarization can be specified by $\theta$ ($\theta$ is the angle between the polarization $\overline{M}$ and the resultant field $\overline{B}=\overline{B}_p+\overline{B}_e$) and $\psi$ where $\psi$ is the angle about $\overline{B}$ with respect to the plane of $\overline{B}_p$ and $\overline{B}_e$, viz., in the plane of FIG. 3. If $\alpha$ and its first several $\phi$-derivatives are much less than one, the approximate polarization positions are given by $$\theta = \tan^{-1}\alpha = \tan^{-1}A'$$

$$\psi = \pi/2 - \tan^{-1}(d\alpha/d\phi) \qquad (10)$$

As before, the primes indicate a general position in the formation rather than values at the edge of the borehole. From (9), $$E = |<\sin(\tan^{-1} A') \, e^{i\pi/2}>| \qquad (11)$$

$$= (1/A) \int_0^A \sin(\tan^{-1} A') \, dA'$$

$$= \frac{1}{A} \int_0^A \frac{A'}{\sqrt{1 + A'^2}} \, dA'$$

$$E = (\sqrt{1 + A^2} - 1)/A \qquad \text{(small A)}$$

From (10), the obtained values are used as starting points for numerical integrations to compute $\theta$ and $\psi$ for the part of the cutoff for which $\alpha$ is not very small and are plotted in FIG. 4.

FIG. 4 is a series of curves 55 showing the buildup of the angle $\theta$ during cutoff as a function of angle $\phi_e$. Curve maxima are connected along dotted line 56. Note that the curves 55 are for constant $A' = G' = \alpha$; i.e., constant $\overline{B}_{c\perp}$. Also note that curve segments to the right of dotted line 56 are not usable for signal because of rapid phase changes.

FIG. 5 is a series of curves 57 to show the interdependence of $\phi$, $\psi$, and $\sin \theta$ as a function of $\phi$ for constant $A' = 0.75$, thus showing the effect of various angles between the earth's field and polarizing field on the former. Precessing polarization is proportional to $\sin \theta$, and its coupling to the NML coil is proportional to $\sin \phi_e$. In NML, if the borehole axis is parallel to the earth's field, much of the signal comes from regions where $\phi_e$ is close to 90° ($\pi/3$ radians). If the angle between the axis and the earth's field is 30°, most of the signal comes from regions with $\phi_e$ between 60° and 120° ($\pi/3$ and $2\pi/2$ radians). From FIG. 5, it is seen that this range of angles does not drastically reduce the signal below that which would be obtained with $\phi_e$ very close to 90°. I.e., $\sin \theta$ curve 57a is roughly linear in the vicinity of 90°, giving an average only a little lower than for 90° after putting in the coupling factor. The phase differences are mild. If the earth's field is perpendicular to the borehole axis, about half the signal is lost.

Similarly, from Equation (9), values of E can be obtained by computer without making the approximation (11). Such values are shown in FIG. 6 as a series of curves 58a, 58b, and 58c. Curve 58a shows E values for a coil circuit like that of FIG. 2, except it has been critically damped during cutoff; curve 58b is for a coil circuit in which the resistor 43 of FIG. 2 has been placed in series with the coil 35; and curve 58c illustrates E values for a coil circuit that has been designed to provide linear cutoff and no overshoot.

Equation (11) may be altered by somewhat compressing A for larger values to give a good fit to the computed values for larger A.

$$E = (\sqrt{1 + x^2} - 1)/x; \quad x = A^{(10+A)/(10+2A)} \quad (12)$$

$$A = 0, \quad (dE/dA) = \tfrac{1}{2}; \quad (d^2E/dA^2) = 0 \quad (12a)$$

ENHANCEMENT OF $\theta$ BY RESONANT PULSES AFTER CUTOFF WITH VERY SMALL A' WITHOUT MINIMIZING RESIDUAL POLARIZATION For very small $A'$, $\hat{M}$ is nearly parallel to $\hat{B}_e$. If an oscillating field is applied parallel to $\hat{B}_p$, this field can be resolved into components parallel $\hat{B}_e$ and parallel to $\hat{B}_2$ (i.e., perpendicular to $\hat{B}_e$). Note in this regard that $\hat{B}$, and $\hat{B}_2$ are defined as follows: $\hat{B}_1\hat{B}_3 \times \hat{B}_p$ and $\hat{B}_2 = \hat{B}_1 \times \hat{B}_3$. Further, the component parallel to $\hat{B}_2$ can be resolved into two components rotating in opposite directions in the plane of $\hat{B}_1$ and $\hat{B}_2$, each with amplitude half that of the component parallel to $B_2$. Then $$B'_{rot} = (\tfrac{1}{2}) B'_{osc} \sin \phi_e \quad (13)$$

If $B'_{rot}$ is substantially smaller than the earth's field and if the frequency of the field is the proton precession (Larmor frequency), the component of the field parallel to the earth's field and the rotating component, whose sense is opposite to that of the proton precession, can be ignored.

If the polarization is viewed from a frame of reference rotating about $\hat{B}_e$ with the earth's-field precession frequency, it is seen that a secondary precession at rate $B'_{osc}$ about some axis in the plane of $\hat{B}_1$ and $\hat{B}_2$ (i.e., perpendicular to $\hat{B}_e$). The position of this axis depends on the phase of the oscillating pulse with respect to the time one jumps onto the rotating reference frame. If $B'_{osc}$ is of fixed amplitude and is applied for a time $\Delta t$, the polarization is rotated by an angle $$\mu = B'_{rot} \Delta t \quad (14)$$

If $\theta$ is small at the end of cutoff with very small A, we have at the end of the oscillating pulse $\theta \simeq \mu'$.

The concept of a rotating frame of reference has been discussed in my prior patents with respect to NMR response of drilling chips. A difference in the NML application is that the oscillating pulse is not necessarily perpendicular to the precession field and that in the NML the strength of $B'_{osc}$ varies within the sample from zero to some maximum value instead of being substantially constant over the sample.

Since $\mu'$ is proportional to $G'$, the average indicated in (9) may be taken with respect to $\mu'$ instead of $A'$. Note that in our approximation, $\psi$ is constant and can be ignored for the purpose of calculating cutoff efficiency. Thus, we have $$E = (1/\mu) \int_0^\mu \sin \mu' \, d\mu' = (1 - \cos \mu)/\mu \quad (15)$$

This function has a maximum of $E_m$ at $\mu = \mu_m$, where $$E_m = 0.7246114$$

$$\mu m = 2.331122 \text{ radians} = 133.5635° \quad (16)$$

Note that the value of the current in the coil necessary to produce a rotation $\mu$ at the edge of the borehole is a function of the borehole size in the case of a centered coil system. That is, one would need to "tune" the oscillating current to the borehole size.

The computation of this section shows that a cutoff efficiency of $72\tfrac{1}{2}\%$ is attainable even with very slow cutoff. However, there are several disadvantages to slow cutoff because of relaxation, which is ignored in the definition of cutoff efficiency. We will see in later sections that one can use different (usually lesser) values of $\mu$ to enhance cutoff efficiency even when G is not small, with cutoff efficiencies somewhat higher than $E_m$.

RING DOWN WITHOUT MINIMIZING RESIDUAL POLARIZATION

The oscillating pulses discussed in the last section are provided by causing the coil 35 to ring. If separate polarizing and receiving coils are employed, either or both coils could be used, either simultaneously or in sequence.

In order to provide the oscillating pulses, it is preferred to cause the coil 35 to ring when tuned to the proton precession frequency. If $B'_{rot}$ is not constant in time, the generalization of (14), $$\mu' = \int_0^t B'_{rot}(t') \, dt' \quad (17)$$

-continued

If $R'_{rot} = B'_o e^{-t/\tau}$, then $$\mu' = B'_o \int_0^\infty e^{-t/\tau} dt = B'_o \tau$$

The ringing method of applying oscillating pulses has the advantages of convenience, of not having to disconnect the tuning condenser, and of a pulse form not ending with a switching disturbance.

RING DOWN WITHOUT MINIMIZING RESIDUAL POLARIZATION VIA SIMPLE PARALLEL CIRCUIT

FIG. 7 shows a simplified basic NML single-resistor 60 in parallel with coil 61 and its turning condenser 62, like that of FIG. 2, in which the polarizing field has been cut off via opening the contacts of switch 63. The value of condenser 62 tunes to the nuclear precession frequency when the damping resistor 60 has been disconnected. Also in the circuit is a voltage limiter 64, which limits the back-voltage during polarizing current cutoff to some definite value. This limiter takes the form of a pair of Zener diodes. The resistance value R of resistor 60, which lowers the Q of the input circuit during cutoff, would presumably be disconnected after cutoff and before signal observation. This is achieved by deactivating switch 65 during such detection period. If wide bandwidth is desired during signal observation, one would presumably accomplish this negative feedback rather than the introduction of an additional source of noise in the circuit.

The polarizing current is assumed to be held constant up to some chosen time, at which the source of current is removed (shown symbolically by opening the contacts of switch 63), and the current through coil 61 flow for a time through voltage limiter 64 and the resistor 60. While current is flowing through voltage limiter 64, the voltage is constant across the coil 61, and the current through the resistor 60 is also constant. The current through the coil 61 decreases linearly (the rate being the ratio of the voltage across the limiter 64 to the coil inductance) until the current through the limiter 64 reaches zero. This instant is defined as time-zero, or t=0. The voltage limiter 64 is assumed effectively out of the picture after this time. The current through the coil 61 before this time is $$I = \frac{-E_c}{L} t \quad t \leq 0 \tag{19}$$

By noting the definition of G and A in the definitions section, the polarizing field at the edge of the borehole is given by $$B_p = -\gamma B_e^2 At \cong -At \quad t \leq 0 \tag{20}$$

since $Q = R/X$ for the parallel circuit, with $X = \omega_o L$, and $\omega_o$ having unit in the system of units given in the above section. Again, note that to refer to general positions in the formation instead of the edge of the borehole merely need add the "prime" symbols to $B_p$, G, A, etc.

Since $\omega_o = (LC)^{-\frac{1}{2}}$ and $X = (L/C)^{\frac{1}{2}}$, the resonant angular frequency for noninfinite Q is $$\omega = \left[1 - \frac{1}{(2Q)^2}\right]^{\frac{1}{2}} \tag{21}$$

After time-zero, the input circuit will ring with time constant 2Q (i.e., $2Q/\omega_o$). The transient amplitude and phase are determined by matching the amplitude and slope of Equation (20) at t=0. The solution is, for $t \geq 0$, $$B_p = A \left\{ \frac{1}{Q} \cos \omega t - \frac{1 - 1/(2Q^2)}{[1 - 1/(2Q)^2]^{\frac{1}{2}}} \sin \omega t \right\} e^{-t/(2Q)} \tag{22}$$

$$\frac{dB_p}{dt} = A \left\{ \cos \omega t + \frac{1 - 1/(2Q^2)}{[(2Q)^2 - 1]^{\frac{1}{2}}} \sin \omega t \right\} e^{-t/(2Q)} \tag{23}$$

In the special case of critical damping $Q = \frac{1}{2}$ for $t \geq 0$ $$B_p = A(2 + t) e^{-t} \tag{24}$$

$$\frac{dB_p}{dt} = -A(1 + t) e^{-t}$$

RING DOWN WITHOUT MINIMIZING RESIDUAL POLARIZATION VIA SIMPLE SERIES CIRCUIT

FIG. 8 shows a simple series circuit in which the Q after cutoff, via opening the contacts of switches 59a and 59b, is determined by the resistor 66 in series with tuning condenser 67. In this case, the current through coil 68 is zero at the time when voltage limiter 69 drops out of the picture. After the transient has decayed and before signal observation, presumably the resistor 66 is shorted by the condenser 67. Here, the phase of the transient is simple.

$$B_p = -At \quad t \leq 0 \tag{25}$$

$$B_p = -(A/\omega) \sin \omega t \, e^{-t/(2Q)} \tag{26}$$

$$\frac{dB_p}{dt} = A \left\{ \cos \omega t + \frac{1}{(2Q)^2 - 1^{\frac{1}{2}}} \sin \omega t \right\} e^{-t/(2Q)}$$

$$t \geq 0$$

The angular frequency $\omega$ is still given by (21).
In the case of critical damping (Q=1/2), $$B_p = A t e^{-t} \quad t \geq 0 \tag{27}$$

$$\frac{dB_p}{dt} = -A(1 + t) e^{-t}$$

SLOW CUTOFF WITH θ ENHANCEMENT BUT WITHOUT MINIMIZING RESIDUAL POLARIZATION

If Q is of the order of 2.0 or more, the difference between (22) and (26) is mainly a phase shift by an angle of the order of 1/Q, or, in our units, a shift of time-zero by about 1/Q. Thus, for $Q \geq 2$, similar results for the parallel and series arrangements, is expected.

For smaller Q, the situation is very different. In the case of critical damping by the parallel resistor 60 of FIG. 7, the current through the coil 61 never reverses, and the cutoff efficiency is much less than with simple linear cutoff alone. Here, for very small A, the conditions for validity of (31) are fulfilled for the entire current decay, that is, to the point where $\alpha$ is zero. Thus, one expects the signal to be of at least second order in A for small A. Furthermore, in the critically damped parallel circuit, the rate of cutoff during the important time when the field is reduced from about the strength of the earth's field to zero is limited by the parallel circuit in such a way that increase of A has almost no effect for A greater than about one.

On the other hand, in the series-damped circuit of FIG. 8, the coil current is affected by neither the condenser 61 nor the resistor 60 until the coil current has been reduced linearly to zero. Then, even for critical damping, there is a current undershoot which enhances the angle $\theta$ for small or moderate A.

For small A in the case of the series circuit (or either circuit if Q is of the order of two or greater), the polarization at the end of the linear portion of the cutoff is nearly in the $\widehat{B}_1$ direction, $$\overline{M} \cdot \overline{B}_1 \simeq A' \qquad (28)$$

Consider the simple series circuit of FIG. 8 and at $t=0$ and adopt the rotating frame of reference mentioned previously. Then the effective field is in the $\overline{B}_1$ direction. For (13), (17), and (18), $$B'_{rot} = (\tfrac{1}{2}) A' e^{-t/(2Q)} \qquad (29)$$

$$\mu' = A'Q \qquad (30)$$

However, the rotating frame picture is not clear for decay times shorter than about a half cycle ($Q = \pi/2$). A possibly more appealing expression for $\pi'$ in the case of small Q is the Fourier component, $$\mu' = (A'/\omega) \int_0^\infty \sin \omega t \, \sin t \, e^{-t/(2Q)} dt \qquad (31)$$

where $$\omega = [1 - 1/(2Q)^2]^{\tfrac{1}{2}}$$

Integral tables and a page of algebra give the same result as before:

$$\mu' = A'Q \qquad (32)$$

The corresponding cosine component is zero. The integration is valid also for Q-values right down to the critically damped value of one-half.

Since this rotation is about the axis $\widehat{B}_1$, from (32)

$$\widehat{M} \cdot \widehat{B}_2 \simeq \sin(A'Q) \simeq A'Q \qquad (33)$$

From (28) and (33), the component of $\widehat{M}$ perpendicular to $\widehat{B}_e$, or the precessing component, is $$\sin \theta \simeq A' \sqrt{1 + Q^2} \qquad (34)$$

It can be shown that an approximate 90° phase shift in the oscillating field can for small A cause the terms combined in (34) to add linearly instead of quadratically. The result is to favor somewhat the small-G components of signal, namely, the signal from farthest out in the formation.

To compote the cutoff efficiency E from (9), now that $\psi$ is constant for small A, and that (9) and (34) give $$E = \langle \sin \theta \rangle = \langle A' \rangle \sqrt{1 + Q^2} \qquad (35)$$

$$\langle A' \rangle = \tfrac{1}{2} A$$

$$E = (\tfrac{1}{2}) A \sqrt{1 + Q^2}$$

The validity of (35) requires that $A \ll 1$ and also $\mu \ll \mu_m$, or from (32), $AQ \ll \mu_m$. Thus, (35) requires $$A \ll 1$$

and $$A \ll \mu_m/Q \qquad (36)$$

NUMERICAL RESULTS FOR ABOVE DESCRIBED SIMPLE PARALLEL AND SERIES CIRCUITS

Through conventional equations of motion for the polarization, numerical computations for the modes of cutoff, given by (20), (22), and (23) for the parallel circuit of FIG. 7, and by (25), (26), and (27) for the series circuit of FIG. 8, have been done. Since the case with the earth's field parallel the borehole axis G=A, is only considered, these symbols can be used interchangeably.

The summary of results is as follows. The maximum cutoff efficiency is for $A \simeq \mu_m/Q$, where $\mu_m = 2.33$, for $Q \geq \sqrt{2}$. The cutoff efficiency can be at least $E_m = 0.725$ at any A by appropriate choice of Q (or appropriate $\mu$-value obtained by other means, i.e., allowing a tuned NML coil to ring with appropriate Q following voltage-limited polarizing current cutoff provides a signal at least 0.725 as great as obtained with instantaneous cutoff. The appropriate Q to maximize signal sensitivity of the coil circuit is of the order of 2.33/G, where G is the cutoff rate, $(B_p/B_e)(\omega T)$, where $B_p$ is the polarizing field strength, $B_e$ is the earth's field, and T is the cutoff time. For $A < 1$ an efficiency of $E_m$ is obtainable, and at an A-value of 2.5 an E-value of about 0.80 can be obtained by appropriate choice of Q for simple series or parallel circuits. The initial slope of E as a function of A is $(\tfrac{1}{2})\sqrt{1+Q^2}$ for the series circuit at any A and for the parallel circuit to a reasonable approximation for A greater than about $\sqrt{2}$. If the Q during cutoff is determined by a resistor in parallel with the tuned coil, Q-values approaching that for critical damping ($Q = \tfrac{1}{2}$) are to be avoided.

$\theta$ and $\psi$ tend to oscillate at an angular rate $0.6 + Q$ as A is increased. $\theta$ tends to oscillate about $\pi/2$ with maxima and minima at multiples of $A = \pi/(0.6+Q)$. $\psi$ oscillates with maxima and minima at odd multiples of half this value.

FIG. 9 shows cutoff efficiencies for a long coil centered in the borehole for various Q values via curves 70. Note that, fortunately, a given Q-value gives reasonable efficiency over a fairly wide range of A'.

Since A' tends to decrease as the inverse square of borehole radius, the illustrated range allows a substantial variation of borehole size and angle between earth's field and borehole axis without necessity of adjusting the ringing Q.

DEPOLARIZATION

In the prior sections, the responses of polarization have been described. In this section, the responses of polarization, including residual polarization to various magnetic fields, will be discussed for the purpose of showing that for coil circuits having normal Q values, both types of prior-in-time polarization, viz., both non-precessing and precessing in the earth's field ($\bar{B}_e$), can be effectively disposed via employment of a series of sham polarizing cycles wherein ringing, in sequence at a series of higher than normal Q values, occurs.

First, a series of slow-rising, amplitude v. time sham polarizing fields of limited duration and strength is generated by disconnectably connecting a polarizing voltage to the coil. The effect of each adiabetic sham polarizing field: the non-precessing components of the residual polarization can easily follow the change in direction of the latter during build-up, i.e, as to the former, the rate of turn-on is brought up gradually over at least a cycle of precession, while previously precessing components are scattered. Then the sham field is cut off and the coil circuit is allowed to ring at one of the higher Q values and generate an oscillating magnetic field that propagates outward into the formation and interacts with certain of the non-precessing components of the residual polarization and after cutoff, causes the latter to precess about the earth's field. Next, the sham process is repeated and re-repeated in the manner previously described except during ringing of the coil circuit associated with the remainder of the series of Q' values, a different Q' value is employed each time. Result: substantially all of the previously non-precessing components of the residual polarization are forced into precession about the earth's field and are subsequently scattered. Note that components caused to precess by the final sham cycle are scattered by the turn-on segment of the next-in-time polarizing field, after reinsertion of circuit elements to establish a normal circuit Q value. Such field is generated by driving the coil with a next-in-time polarizing voltage. Result: a field having similar adiabatic characteristics as the sham polarizing field, viz., having a turn-on segment those amplitude vs. time excursions are slow-rising, causing the precessing components that were previously non-precessing to be easily scattered, i.e., wildly precess about the polarizing field. During such precession, any residual polarization that ends up recessing in the polarizing field during turn-on, will attain a precession frequency that is so high and varies so rapidly with position relative to the axis of the well bore, that its effect is nil.

In this regard, a review of the general aspect of the dynamics of the manipulation of the nuclear polarization by different types of magnetic fields, is believed to be in order and is presented below. The dynamics are regarded for this purpose as being separate from relaxation, and such dynamics will be considered to occur in times that are short compared to relaxation times.

In the first place, note that polarization in a static field simply precesses about the latter. The component of polarization parallel to the field is not affected by the latter. The perpendicular component, however, precesses and is the component that generates the NML signal. If the field changes strength without changing direction, the precession frequency changes with the field, but the angle between the polarization and the field remains unchanged.

Polarization can be manipulated also when a magnetic field changes direction. Different behavior is a function of the speed of change of the field, viz., whether or not it is fast (or sudden), intermediate, or slow (or adiabatic). Intermediate speed is when the instantaneous angular frequency of rotation $\Omega$ of the magnetic field is comparable to the instantaneous precession frequency $\omega$ of the polarization about that field. For fast changes, viz., where $\Omega >> \omega$, the polarization does not have time to adapt to the change in direction of the field. Wherever the polarization happens to be, precessing or not, it simply proceeds to precess around the new field.

There can be any degree of interchange between precessing and non-precessing polarization when there is a sudden change in direction of the magnetic field.

Polarization can be manipulated also by resonant magnetic fields as previously indicated.

The effects of fields near the precession, or "Larmor" frequency can be visualized by considering the system from a rotating reference frame. If we consider a polarization from the viewpoint of a reference frame rotating about a static magnetic field at the precession frequency corresponding to the field, the system appears to behave as if the field were removed. That is, we are rotating with the polarization; so it appears to be standing still. We are now in a position to visualize the effect of a magnetic field rotating at or near the precession frequency. The rotating field simply looks like a static field in the rotating reference frame. The polarization simply precesses in this field. If the frequency is not exactly the precession frequency, then a small part of the static field is uncanceled. As the rotating field is turned on or off, we can have changes of angle of the apparent field in the rotating frame, and the fast, intermediate, or slow effects apply in this frame.

If a rotating field is applied just long enough for precession in the rotating frame by 90°, it is said to be a 90° pulse. Non-precessing polarization in the non-rotating reference frame is thus turned so that it becomes precessing polarization capable of generating a signal.

In actual practice, the rotating field is derived from an oscillating field, which can be regarded as the sum of two fields rotating in opposite directions. The one rotating opposite to the precession direction reverses its effect on the polarization so rapidly that it has no significant effect.

There is some possibility of precessing polarization from one signal cycle surviving the following polarizing cycle, if it is short, making an unwanted contribution to the next signal. Even if the precession frequency varies with position in the formation because of magnetic mineral grains or for other reasons, there is the possibility of unwanted signal contributions from "echoes". The phenomenon arises as follows. If precessing polarization is dispersed in phase by this variation in frequency, and if a polarizing field is applied nonabatically, some of the elements of polarization will end up parallel or antiparallel to the polarizing field, depending on their phase at the beginning of turn-on. Since the process, complicated as it is, is linear, the parallel and antiparallel polarization started out with half-integer cycles of phase difference. The remaining polarization precesses in the polarizing field and is thoroughly dispersed, as the field is very strong and inhomogeneous. After polarizing field cutoff, part of the polarization resumes precession. After precession for as long as the previous precession time, if diffusion does not significantly change the precession frequency of individual molecules, the half-integer polarization phase differences are doubled to become integer cycles of phase difference. With the surviving polarization back in phase, we have an echo of the previous signal added to the new signal, probably with random relative phase.

But returning to manipulation by directional changes of the associated magnetic fields, when the change is slow, viz., when $\Omega << \omega$, the consequence is that the polarization $\overline{M}$ follows the polarizing field as the field changes direction. Polarization that is parallel to the field, changes direction to remain parallel after application of the latter, and precessing polarization adapts to remain precessing around the new field.

However, while both types of residual prior-in-time polarization usually have to be considered, viz., one must consider both components of polarization that is parallel to the earth's field but which is non-precessing, and that which precesses about the earth's field, I have discovered that the effect of both types can be scattered provided a set of polarizing periods is used: a first series of sham cycles that have slow turn-on segments as well as permitting ring down at one and then others of associated higher Q' values; finally a second next-in-time polarizing period having a slow-rising amplitude vs. time turn-on segment. Result: different groups of previously non-precessing components of the residual polarization follow the turn-on segment of the next-in-time sham field and after being forced into precession about the earth's field, are scattered by the slow-rising turn-on segment of a subsequent sham field. Then after cutoff of the last sham field and after the final group of previously non-precessing components have been forced into precession, the latter are also scattered by the slow-rising turn-on segment of the next-in-time polarizing field. Note that substantially all of the previously non-precessing components are parallel to the earth's field and hence are caused to precess about that field by the cutoff of the sham polarizing field. Thus, they can be easily scattered by the build-up of the next-in-time sham field or the final full polarizing field.

FIGS. 10 and 11 illustrate the influence of linear cutoff as function of high intermediate rates without ringing.

In FIG. 10, the effect of a sudden turnoff of the prior-in-time cycle as a function of angle $\theta$ between the polarization ($\overline{M}$) and the earth's field ($\overline{B}_e$) and angle $\phi$ between the polarizing field ($\overline{B}_p$) and the resultant field ($\overline{B}$) is illustrated. Note that for curve 75 that $\theta$ is nearly equal to $\phi$. Dimensionless parameter A assumes the axis of the borehole is parallel to the earth's magnetic field. Result: if the cutoff is sudden, nearly as many components of residual polarization are parallel to the earth's field as opposed. And even though the resultant follows the slow turn-on of the next-in-time polarizing field, its contribution is surprisingly small.

But FIG. 11 shows that if cutoff is at an intermediate rate, curve 76 is not linear and remains at values less than 90° for nearly all the ranges of $\phi_e$. That is, curve segment 77 is always less than 90° over the range of $\phi_e$ values from $\phi_e$ of 45° to 135°. Thus, nearly all of the non-precessing polarization is parallel to the earth's field with almost none opposed. If the relaxation time of the prior-in-time polarization period was long, such unbalanced non-precessing residual polarization will give a headstart to the next-in-time polarization build-up.

That is to say, if the next-in-time polarization field has the attribute of a slow amplitude v. time turn-on rate, the aforementioned unbalanced prior-in-time residual polarization will be reoriented into the direction of the latter polarizing field. Build-up does not start at zero and erroneous relaxation time will be computed.

But in accordance with the present invention, such non-precessing unbalanced residual polarization is first converted into precessing components and then scattered by the next-in-time polarization field. Mechanism for conversion: using a sham polarizing cycle in which the sham field is allowed to ring at a frequency related to the high Q value for the coil circuit.

Before discussing this aspect in detail, a review of how much the residual polarization contributes to the next-in-time collection cycle is in order and is given below.

Ignoring relaxation, the signal from the $n^{th}$ previous polarization is proportional to $(p \cos \theta)^n$, or, with slow turn-on, simply $\cos^n \theta$. If $E_n(A_o)$ is defined as the signal from the $n^{th}$ previous polarization to that of the present polarization, neglecting relaxation, then $$E_n(A_o) = \frac{\int_0^{A_o} (p \cos \theta)^n \sin \theta \, e^{i\psi} f(A) \, dA}{\int_0^{A_o} \sin \theta \, e^{i\psi} f(A) \, dA} \quad (37)$$

FIGS. 12, 13 and 14 illustrate that the Q value of the coil have an effect on the residual polarization.

For example, in FIGS. 12 and 13, note for curves 78 of $\theta$ as a functional A, there are segments of $\theta$ generally indicated at 79 greater than 90°. Hence, from Eq (37), supra, it is seen that the $\cos \theta$ factor therein provides for some cancellation for odd powers of n, whereas for even powers of n, all contribution add so long as phase $\psi$ does not vary drastically. Luckily, the large variations in $\psi$ occur outside the range of plausible tool designs. Also, it should be noted in connection with Eq (37), that it is assumed that the normalized Q' shown in FIGS. 12 and 13 was chosen for optimum signal response. But if a sham polarizing period of non-optimum but higher Q' value as shown in FIG. 14 is interposed between collection cycles, such higher Q' value would provide different values of r at a given point in the formation.

FIG. 15 illustrates how the coil circuit of FIG. 2 can be modified to bring about a series of higher Q' values during sequential sham ringing of the coil circuit.

As shown, the modified polarizing and detection circuit 13' includes a series of additional resistors 80, 81, and 82 placed in parallel with the coil 35 between conductor segments 36e and 36f, 36f and 36g and 36g and 36h, respectively. Each resistor 80, 81, 82 has a leg connected to ground 39 through a separate switch 83, 84, 85, respectively. Control of the switches 83-85 is via the presence (or absence) of a control signal on conductors 18h, 18i, 18j, respectively. The conductors 18g-18j connect uphole to the system 19 at the earth's surface. Note also that the operations of the conventional resistive element 43 previously described has also been slightly modified wherein the switch 45 in its ground leg is placed in an inactive state during the series of sham cycles. At the same time switch 45 is deactivated first one of the three sham polarizing fields is generated. Each sham field has an adiabatic turn-on segment that permits the non-precessing components of the residual polarization to follow the latter, while the previously precessing components are scattered thereby. After each of the sham fields have been generated and cut off, one of the switches 83-85, say, switch 83, is activated. During ringing of the coil circuit by the collapse of sham field, the Q value of the circuit is directly related to the resistance value of the sham resistor 80, the higher the value of the latter, the greater the Q value of the coil circuit. As a result, the generated oscillating magnetic field propagating outward in the formation has the ability to be able to interact with certain non-precessing components of the residual polarization and after cutoff, cause the latter to precess about the earth's field. Next, the switch 83 is deactivated, and the second of the three polarizing fields is generated and then cut off, followed by the activation of the second of the switches 83-85, say, switch 84. Ringing of the circuit then occurs at a Q value that is directly related the resistance value of the sham resistor 81, the higher the value of the latter, the greater the Q value of the coil circuit. As a result, the generated oscillating magnetic field again propagating outward in the formation has the ability to be able to interact with certain other non-precessing components of the residual polarization and after cutoff, cause the latter to precess about the earth's field. Then the switch 84 is deactivated, and the third of the three polarizing fields is generated and then cut off, followed by the activation of the third of the switches 83-85, viz., switch 85. Ringing of the circuit again occurs at a Q value that is directly related to the resistance value of the sham resistor 82, the higher the value of the latter, the greater the Q value of the coil circuit. As a result, again the generated oscillating magnetic field has the ability to be able to interact with yet additional certain other non-precessing components of the residual polarization and cause the latter to precess about the earth's field. Result: substantially all previously non-precessing components of the residual polarization, are forced into precession about the earth's field at one time or another and then are scattered by the turn-on segment of the next-in-time field.

In more detail, the coil 35 is still connected uphole to the uphole system 19 via: (i) on one side by conductor segment 36a, switch 37 and uphole conductor 18c and (ii) on the other side, by conductor 18b. In series with conductor segment 36a are conductor segments 36b-36c . . . 36i. The coil 35 is connected to ground at 39 by means of additional conductor segments 40a . . . 40g. Between the segments 36e . . . 36h are the Q-raising resistors 80 . . . 82. The resistors 80 . . . 82 are the circuit addition to the elements previously described (viz., Zener diodes 42, resistance element 43 and capacitor 44, all parallel to coil 35). Switches 83 . . . 85 disconnectably connect an associated Q-raising resistor 80, 81 or 82 to ground 39 on command via an activation signal from the uphole system 19 that closes the contacts of the particular switch 83, 84 or 85.

In operations, during the first sham, polarizing period, the switches 37, 45, 46, 83, 84, and 85 operate as follows. That is, the contacts of switch 37 are closed while those of switches 45, 46 and 83-85 are open.

The result is the generation of a slow-rising amplitude vs. time sham polarizing field in which the interaction between the field and the polarization is adiabatic, so that non-precessing components of the residual polarization will be reoriented about the magnetic lines of the field during build-up, while precessing components can be scattered thereby. Note that the non-precessing components of residual polarization will follow the change in direction of the sham polarization field provided the instantaneous angular frequency of rotation $\Omega$ of the sham field is much less than the instantaneous precessional frequency $\omega$ viz., $\Omega < < \omega$. In this regard, ratios of $\omega$ to $\Omega$ in a range of 10 to 100 are satisfactory in establishing the desired adiabatic form of operation in accordance with the present invention.

That is to say, assuming that resulting sham field is proportional to $t-(1-\exp(-\omega_o Rt))/R\omega_o$ during turn-on, where $\omega_o$ is frequency, t is time, and R is the dimensionless turn-on rate for voltage driving the coil 35 (as explained below), then the amplitude vs. time characteristics of such field are determined by solution of the above-identified equation which for small $\omega_o Rt$, is approximately of parabolic form, viz., $(\frac{1}{2})\omega_o Rt^2$. Its greatest change in slope occurs over the initial time frame where the slope of the parabolic portion of the equation describing such field undergoes the greatest change. That is, at its vertex, its slope is zero; thereafter, the slope is more linear and terminates in a field whose value is at least several times greater than the strength of the earth's field. Assuming that the earth's field is $\frac{1}{2}$ gauss, then the slow-rising sham field would thus terminate at a value of about 3 to 5 gauss.

Thereafter, the sham polarizing signal is cut off by opening the contacts of switch 37 while the contacts of switch 83 are closed. Ringing of the coil circuit at a higher frequency related to the artificially higher Q' value associated with resistor 80 of the coil circuit, then occurs. As a result, an oscillating magnetic field is generated which propagates outwardly from the coil and interacts with certain of the non-precessing components of the residual polarization and after cutoff causes the latter to begin to precess about the earth's field. Next, the sham process is repeated and re-repeated in the manner previously described except during ringing of the coil circuit associated with the remainder of the series of Q' values, a different Q' value is employed each time. During ring down associated with the second sham cycle, for example, resistor 81 is switched into the coil circuit by closing the contacts of switch 84, while in a similar manner, during the ring down period associated with the third sham cycle, resistor 82 is activated by closing the contacts of switch 85.

Absolute range of increasing the Q of the coil circuit during ringing depends on a number of factors foremost of which is the normal maximum Q previously established. If the normal Q has been established at about 1, then increasing the Q of the coil in steps to Q' values of 2, 4 and 8 provides for adequate operations, although Q' values of 4, 8 and 16 are preferred. A set of two Q' values of 8 and 16 may also be adequate where the normal Q is a relatively low value.

It should be noted during subsequent polarization that the contacts of switch 37 is closed while those of switches 45, 46 and 83-85 are opened. The coil 35 is then driven with a polarizing electrical signal having a slow-rising amplitude vs. time turn-on segment as previously described. The result is a more powerful but still slowly rising polarization field of the next-in-time cycle that scatters the final group of previously non-precessing components as previously described. Reason: any residual polarization that ends up precessing in the next-in-time field will have a precession frequency that is so high and varies so rapidly with position that its effect is nil.

FIG. 16 shows how the maximum amount of now precessing polarization which had failed to remain precessing and be scattered by the next-in-time field, $\Delta\theta$, varies as a function of $\Delta\theta$, and the dimensionless parameter A, the angle $\theta$ being that between the polarization $\overline{M}$ and the resultant field ($\overline{B}$).

In this regard, note that it can be shown that if the field is turned on at a constant rate and with an abrupt start, the change in angle $\theta$, viz., $\Delta\theta$, oscillates between zero and an angle in the range of $-2A$ to $+2A$ where $\theta$ is the angle between the polarization $\overline{M}$ and the resultant field ($\overline{B}$) and A is a dimensionless parameter proportional to rate parameter $\alpha$. The change in angle $\theta$ depends on the phase angle $\psi$ of the polarization $\overline{M}$ when turn-on is initiated. The oscillation dies out as $\alpha$ decreases with increasing angle $\theta$, leaving a final angle change between $-A$ and $+A$. Computation based on the equations of motion similar to those previously used, indicate that for various A values and initial phases that the largest change in $\theta$ is for initial phase $\psi$ of approximately $-\tan(0.1+1/A)$. In FIG. 16, note if A at some point in the formation is 0.1 as much as ten percent of the precessing polarization could end up in the direction of polarizing field, depending on the phase at the moment of turn-on. However, if A is 0.1 merely at the edge of the borehole, the average with respect to signal contribution would be roughly $A=0.05$ leaving an initial polarization of up to 5% of the previous precessing polarization. Since the fraction of precessing polarization ending up in the direction of the polarizing field varies between the maximum parallel to the maximum opposed (depending on the exact instant of onset of turn-on), it is expected that the net change in $\theta$ can be reduced substantially by a turn-on rate such that the next-in-time field is brought from zero to the maximum field over at least a cycle of precession. For proton precession, a cycle is typically only one-half of a millisecond. Hence, very little operational time is lost by such a step.

FIG. 17 illustrates details of signal-forming and driving network 22 for bringing about the required slow-rising sham and next-in-time polarizing fields mentioned above.

In the FIG., note that the network 22 at the earth's surface, includes a function generator comprising a pulse generator 90 connected through a gate 91 and a counter 92 to a D/A convertor 93 capable of generating the required slow-rising polarizing voltage at the downhole coil. In this regard, the output signal of the convertor 93 is clocked out by the counter 92 at a rate that provides for the needed slow-rising sham and next-in-time polarizing fields via the polarizing coil downhole within the sonde, viz., fields which $\Omega<<\omega$ where $\omega$ is the instantaneous angular frequency of rotation of the polarizing field and $\omega$ is the instantaneous precession frequency of the polarization $\overline{M}$ within the earth formation adjacent to the sonde. Counter 92 is preferably provided with a logic gate 94 in its clock circuit so that when the counter reaches 9999 state before reset, gate 91 is deactivated. The ramp of the counter is linear over the build-up segment of the polarizing signal but since it is a function of the pulse rate of pulse generator 90, can be easily reprogrammed if desired. Hence, the output of the D/A convertor 93 can easily be controlled to bring up the needed fields over at least a cycle of proton precession via operation of counter 92 in conjunction with the pulse generator 90 for controlling the build-up of the D/A convertor 93. Thus in effect, the counter 92 provides the network 22 with an appropriate waveform by which the required slow-rising amplitude vs. time sham and next-in-time polarizing fields can be generated downhole, viz., a field that is slow-rising from zero to several times the strength of the earth's field. The electrical signal output of the D/A convertor 93 that provides such field, is, of course, of the required analogous waveform.

In operation, note from FIG. 1, that for much of the polarizing field build-up, sin $\phi$ is small. From Eq. (2) it can be seen after $\phi$ is small after that the rate of build-up can be greatly increased without increasing $\alpha$.

Polarizing field build-up for a constant A corresponds to a constant voltage output from the D/A convertor during build-up. And if the voltage applied to the polarizing coil 35 of FIG. 15 defines a time constant $1/\omega_o R$, where R is a dimensionless turn-on rate for voltage, the voltage is proportional to $1-\exp(-\omega_o Rt)$. The resulting polarizing field is thus proportional to $t-(1-\exp(-\omega_o Rt))/R\omega_o$, which for small $\omega_o$ Rt, is approximately of parabolic form, viz., $(\frac{1}{2})\omega_o Rt^2$.

FIG. 18 illustrates the next-in-time polarizing field for scattering the residual polarization as a curve 100 having a slow-rising amplitude vs. time build-up segment 101. The strength of the field as defined by the curve 100 is the ordinate while time is the abscissa. Note that the slow-rising segment 101 is a part of the build-up section 102. The amplitude vs. time characteristics of the segment 101, of course, are determined by solution of the quadratic equation previously described and has the greatest change in slope over the initial time frame, say, from $t=0$ to $t=1$ milliseconds where the slope of the parabolic portion, of the equation undergoes the greatest change. I.e., at its vertex at $t=0$, the slope of the segment 101 is zero; thereafter, the slope is more linear, say, from $t=1$ to $t=5$. The terminus of the segment 101 is seen to define a field that is at least several times greater than the strength of the earth's field. Assuming that the earth's field is $\frac{1}{2}$ gauss, then the slow-rising segment 101 is seen to terminate at a value of about 5 gauss or 10 times the earth's field strength at a time $t=5$ milliseconds. Above $t=5$ milliseconds the rate of rise of the remainder of the build-up section 102 can be very fast without affecting the role played by the segment 101 in reducing the effects of residual polarization.

As in the manner previously explained for substantial ranges of A and R, minimal integrations have been carried out.

Again, the change in $\theta$ depends on the starting phase $\psi_o$, so for each combination of A and R, the computation was made over a sufficient range of $\psi_o$ to determine the maximum change in $\theta$. For change in $\theta$ of a few percent or less, the relationship emerged as $$\Delta\theta_{max} \cong AR/(1+R).$$

FIG. 19 shows the maximum change in $\theta$ as a function of R for $A=1$ and $A=0.5$. The voltage available for polarizing current turn-on is not likely to provide for A large compared to one. The dashed lines correspond to $\Delta\theta=AR$. For $A=1$, a R value of 0.03 reduces the change in $\theta$ to a few percent of a radian. This corresponds to $\frac{1}{2}\pi R\cong 5$ cycles of precession in the earth's field, normally about 2.5 ms. This is an order of magnitude less than the build-up time for the polarizing field in normal NML operations. Thus, applying turn-on voltage with a time constant of a few milliseconds will lead to effectively slow polarizing field turn-on in the sense of not changing $\theta$ enough to have previously precessing polarization build-up in the polarizing field.

In implementing effectively slow turn-on, operations that result in ringing the tuned NML coil during turn-on should be avoided. Hence, a brief discussion of how the Q' values are initially determined for the series of sham cycles, is in order and is presented below.

In order to establish the correct coil Q value, the NML tool is placed in a calibration tank, in which the coil of the polarizing and detection circuitry is surrounded by a section of sand or the like, containing entrained fluids, such as water. There is one basic way to establish the series of values for the coil and its associated circuit elements for use in the sham cycles, viz., (1) Tune the coil to a Q value that generates an oscillating field during ringing that maximizes the NML signal associated with nuclear polarization established by the dipole moments of the entrained fluid nuclei by a prior-in-time polarizing field of predetermined characteristics. Detection occurs after the polarizing field has been cutoff and ringing of the coil circuit has terminated. Then the Q of the coil and associated elements are mathematically increased a series of preselected amount as explained below, to establish the high Q' values to be used in the sham cycles.

BRIEF DESCRIPTION OF METHOD (1), SUPRA

The purpose of method (1): to establish a series of high Q' values for the coil circuit of the polarizing and detection circuitry of an NML tool so as to reduce the effects of residual polarization in nuclear magnetic logging (NML) operations. In that way, a series of collection cycles normalized to a common depth interval can be carried out more swiftly and accurately than in conventional NML operations. The selection criterion for each Q': It must be greater than that which maximizes NML precessional signal response after termination of a polarization field. The pertinent cycle has been previously determined based on which cycle is most likely to be influenced by the effects of residual polarization left over from the prior-in-time collection cycle. The particular residual polarization exists because of the long time duration of the prior-in-time polarizing period and thus would be most likely to influence the NML signal generated in a later in time collection cycle of interest.

Now in more detail, steps of Method (1) include the following (a) After the tool has been located within the test tank, a polarizing field having a known time duration, is generated by the polarizing and detection circuitry by driving its associated polarizing coil with an electrical signal of known characteristics;

(b) The electrical signal is then cut off after the time duration of step (a) has elapsed;

(c) Then the coil and associated elements are permitted to ring at a frequency related to the proton precession frequency of entrained fluids common to the adjacent formation to be surveyed, to generate a decaying oscillating resonant magnetic field that propagates outwardly and reorients with enhanced results, the nuclear polarization associated with the generated polarizing field prior to cutoff;

(d) Next the Q of the coil and its associated elements that maximizes the NML signal response to the enhanced reoriented polarization of step (c), is determined;

(e) Finally the Q of the coil and its associated elements is mathematically increased selected amounts to form a series of higher Q' values, based on the Q value of step (d). The series of higher Q' values are values that maximize the on-set of precession of previously non-precessing components of the residual polarization. It should be noted that the increases can be based on the normal Q value of step (d). In this regard, stepped increases determied by successive multiplications of the normal Q value of step (d) by a set of terms defined by successive increasing factors equal to 2 raised by an incrementally increasing power integer, has been found to be adequate. For example, assume that the Q and Q' values are identified by an integer set equal to $M_1, M_2 \ldots M_o$ where $M_1$ is 1 associated with the normal Q value of step (d), while $M_2 \ldots M_o$ are integers identifying the increasing order of the series of higher Q' values. If the Q value of step (d) is equal to, say Q, then additional Q' values are equal to Q $2^n$ where n is $1, 2 \ldots (M_o-1)$.

As previously indicated, the coil and its associated elements comprising a portion of the polarizing and detection circuitry during the series of ring downs associated with the series of sham cycles, are connected in circuit with each other so as to provide damping of the oscillating resonant magnetic field radiating from said coil. Such circuit configuration comprises a set of resistive elements in either disconnectable series connection or parallel connection with the conventional resistor of the circuit of FIGS. 7 and 8. Of course, the coil and the associated elements themselves define the series of Q' values and have particular values related to the proton resonant angular frequency ($\omega$) of the entrained fluids in accordance with, $$\text{Resonant frequency } (\omega) = [1 - 1/(2Q')^2]^{\frac{1}{2}}$$

where Q' are the series of values previously determined.

If the coil and its elements are connected in a series damping configuration, as shown in FIG. 8, note that the additional resistive elements are in disconnectable separate parallel connection with the conventional resistor (d). Hence, for ring down during the sham cycles, the additional and the conventional resistor would be disconnectably connected to the output of the condensor 67. Separate grounding legs for the additional resistive elements would each include a switch in series with associated additional resistive elements, the switch also having contacts in the closed position during ring down so as to establish one of the higher Q' value for the coil circuit. That is to say the coil circuit is permitted to ring at the higher Q' during the sham cycle by connecting the conventional resistive element 66 of FIG. 8 in parallel with one of the previously mentioned additional resistive element. Result: overall resistance of the coil circuit is lowered but since the latter is operating in a series dampening mode, the Q of the circuit is artificially higher, viz., at a Q' value of interest. After ring down has been completed, the contacts of the switch in the separate ground leg are opened to disconnect the one additional resistive element from the circuit, as the next polarizing cycle occurs in the same manner as before. After the series of sham cycles at the series of Q' values have been performed, the next-in-time polarizing field having the slow-rising turn-on segment previously described, is generated. However, as previously described, if the coil and its circuit elements are connected in parallel, the artificially higher Q' values are established by increasing the total resistance of the coil circuit in the manner of FIG. 15.

INVESIGATIVE DATA

An investigation has been carried out for various sham Q' values in which the turn-on segment of the sham field is assumed to be slow-rising. It is also assumed that normal tool operation is with $O = \sqrt{2}$, and sham polarizing cycles with ringing at Q=2, 4, and 8, were considered. For each of these Q values, $\theta$ has been approximated by sequences of straight lines and sines or cosines. In the quantities indicated below, Q is understood to be $\sqrt{2}$ indicated otherwise. The functions of $\theta(Q,A)$ and defined as:

$$W = \cos\theta(\sqrt{2}, A) \quad (38)$$
$$X = \cos\theta(2, A)$$
$$Y = \cos\theta(4, A)$$
$$Z = \cos\theta(8, A)$$

Equation (37) has been generalized to allow factors of $\cos\theta$ for different Q values, but also Equation (37) has been specialized by setting p=1, corresponding to slow turn-on of the sham field. Whatever factors of W, X, Y, or Z are used are indicated as a subscript of the term $E(A_o)$ that indicates efficiency of production of signal from residual polarization. For instance, consider $$E_{WWZ}(A_o) = \frac{\int_0^{A_o} WWZ \sin\theta \, e^{i\phi} f(A) \, dA}{\int_0^{A_o} \sin\theta \, e^{i\phi} f(A) \, dA} \quad (39)$$

In this example, $E_{WWZ}(A_o)$ uses the factor W twice. Since W corresponds to normal cutoff, two factors of W represent residual polarization from the second previous cycle. The factor Z indicates one sham polarizing cycle with ringing for Q=8. This would not represent one sham cycle after each normal cycle. A plausible application for this unsymmetrical operation would be in the $T_1$-continuous mode of NML going from a very long polarizing time to two polarizations with much shorter times. The sham cycle might not be needed between the two short polarizing periods.

To see the effects of various combinations of cycles, the integrations indicated in Equation 42 have been done numerically. The computer program using a Hewlett-Packard HP 9825, is shown in Table 1 and is the basis for computations of Tables 2 and 3. Table 2 is for f(A)=1, which corresponds to a long NML coil with an ideal winding distribution. Table 3, with G=0.4, is four $A_o = 1.7$ and borehole diameter 0.5 times coil length. The rough expression for f(A) is given in the Definitions section. The column A is A at the edge of the borehole. The column Sig is signal efficiency computed from the Equation $$E(A_o) = \frac{\int_0^{A_o} WWZ \sin\theta \, e^{i\phi} f(A) \, dA}{\int_0^{A_o} \sin\theta \, e^{i\phi} f(A) \, dA} \quad (40)$$

for the signal from a polarization after normal cutoff. Relaxation is ignored in all these computations. The remaining column headings indicate which $\cos\theta$ factors were used. The W column is the expected signal from residual polarization from the previous polarizing cycle. The WW column is for signal from the second previous polarization. All values are normalized to the direct signal itself and multiplied by 1000.

Signal components resulting from leftover residual polarization will have at least one factor of W in Equation 39, following at least one normal signal-producing cutoff. The columns WY and WZ correspond to the application one sham polarizing cycle, with Q of 4 and 8, respectively. The WWZ column corresponds to the signal from the second previous polarization, with one sham cycle with Q=8. The sham cycle can be either between the first and second or the second and third regular polarizing cycles. The WXZ and WYZ columns indicate a series of two sequential sham cycles with ringing at Q's of 2 and 8, and of 4 and 8, respectively. The order of these sham cycles should not matter. Finally, the WXYZ column indicates a series of those sequential sham cycles with ringing at three different Q values.

In Table 3 note that the Sig column shows a maximum signal efficiency for A=1.72. However, there is reasonable efficiency over a fairly broad range of A. The W column shows that the signal from residual polarization is greatly reduced if A is slightly larger than that for maximum efficiency. In fact, these values are probably low enough for most NML purposes. However, the low values in the W column are not simply due to the dispersal of polarization. As discussed under Equation 40, we have some cancellation from contributions with $\theta$ exceeding $\pi/2$. This cancellation is lost in the WW column for signal from the second previous polarization. The cancellation depends on specific geometry in NML. It depends on borehole radius, and it is changed if the tool is run off-center in the hole.

While WZ and WWZ columns show that a single sham polarizing cycle with Q=8 does a good job of reducing unwanted signal components, the three sham cycles, with Q's of 8, 4 and 2, shown in the column WXYZ, nearly eliminate the residual polarization and its signal. The reason for this is evident from FIG. 14. Noting that $\cos\theta = 0$ at $\theta = \pi/2$, we see W, X, Y, or Z is zero in the near vicinity of nearly any value of A. This is related to the factors of two in the values of Q. In FIG. 14, note that the Q=4 curve crosses $\pi/2$ right under the large peak of the Q=8 curve. The Q=2 curve crosses $\pi/2$ right under the nearly-coincident extremes of the Q=8 and the Q=4 curves. At almost any value of A one of the sham polarizing cycles turns polarization to make most of it precess; then the next-in-time conventional field scatters it. Even the set of three sham-polarizing cycles could be carried out in a time short compared to the time required for polarization of all plausible relaxation times to die away.

SYMBOLS AND DEFINITIONS SECTION

For convenience, the unit of time is here the reciprocal precession angular frequency in the earth's field (the full earth's field, not merely the component perpendicular to the polarizing field). The unit of angular frequency is the precession angular frequency in the earth's field; the unit of field strength is the strength of the earth's field.

$\omega$ instantaneous local precession angular frequency about the resultant field (vector sum of the earth's field and whatever field is produce at a given time and place by the polarizing coil or whatever coil is being considered).

$\Omega$ instantaneous local angular frequency of turning of the resultant field (rate-of-change of direction irrespective of amplitude).

$\alpha = \Omega/\omega$.

R the ratio of the component of the resultant field parallel to the polarizing field to the component of the earth's field perpendicular to the polarizing field.

$\phi = \cot^{-1} R$; $\phi_e$ is $\phi$ when the polarizing field has been reduced to zero, namely, the angle between the earth's field and the polarizing field.

$\theta$ the instantaneous local angle between the resultant field and the polarization.

Note: A prime (') will frequently be used to indicate some quantity at an arbitrary distance into the formation, whereas the symbol without the prime will indicate the quantity at the edge of the borehole.

A the instantaneous value of $d\phi/dt$ (in units mentioned above) at the time during cutoff at constant rate (or extrapolation thereof) when the resultant field is perpendicular to the polarizing field. $A = -(dR/dt)\sin \phi_e$.

G = $-(dR/dt) \sin \phi_e$. Note that dt is in units of reciprocal precession angular frequency in the earth's field and represents the quantity $\gamma B_e dt$ in more general units. Thus, $G = dB_p/dt$ in our units. G is also the polarizing field (in units of the earth's field) divided by the cutoff time (in units of reciprocal precession angular frequency in the earth's field) for constant cutoff rate. $G = A \sin^2 \phi_e$. Note that A and G are the same when the polarizing field is perpendicular to the earth's field (either locally or, in the case in which the earth's field is parallel to the borehole axis, substantially everywhere).

$\hat{B}_1$ the unit vector in the direction $\hat{B}_e \times \hat{B}_p$. $\hat{B}_2 = \hat{B}_1 \times \hat{B}_e$.

$\rho$ distance from the borehole axis.

a borehole radius.

$\mu$ angle of rotation in the rotating frame of reference about some axis perpendicular to the earth's field.

E polarizing field cutoff efficiency neglecting relaxation effects, the ratio of the signal following some particular mode of polarizing field cutoff to the signal for instantaneous cutoff. Note that it is not impossible for E to be greater than 1.0.

EN residual ring down efficiency neglecting relaxation effects, the ratio of the signal from the $n^{th}$ previous polarization to that of a present-in-time polarization.

SIGNAL SENSITIVITY DEPENDENCE ON A

The simplest NML field computation is for the centered "ideal coil", which produces approximately a two-dimensional dipole field. This coil must be long compared to the borehole diameter. The field is perpendicular to the borehole axis, which we will assume to be the direction of the earth's field. The field B is inversely proportional to the square of distance from the axis. Apart from the angles $\theta$ and $\psi$ associated with polarizing field cutoff, the signal contribution from a small volume element is proportional to $B^2$. One factor is for the strength of polarization produced by the field, and the other is for the coupling of the field of the precessing polarization back into the NML coil. Since our computations are for ratios of sensitivities, we will not be concerned with constant multipliers. The sensitivity per unit axial length is proportional to $$dS \sim B^2 \rho d\rho \sim d\rho/\rho^3 \tag{A-1}$$

The factor of $\rho d\rho$ is proportional to the volume element per unit length. The cutoff rate A is also proportional to B. If $A_{oo}$ is the cutoff rate at the edge of a borehole of radius a for our ideal coil system, $$A = A_{oo} a^2/\rho^2 \tag{A-2}$$

Differentiating (A-2) and comparing with (A-1) gives $$dS \sim dA \tag{A-3}$$

This corresponds to $f(A) = 1$ in Equations 4, 5 and 9. If the coil is not long compared to the borehole diameter, the field drops off faster than $1/\rho^2$ for large $\rho$, eventually dropping off as $1/\Sigma^3$ as for a three-dimensional dipole. We will compute the field for a line dipole extending from $z = -b$ to $z = +b$. We limit the computation to the x-direction in the $z = 0$ plane. The field is $$B \sim \frac{\partial^2}{\partial x^2} \int_{-b}^{+b} dz/\sqrt{x^2 + z^2} \tag{A-4}$$

$$B \sim \frac{2b(b^2 + 2x^2)}{x^2(x^2 + b^2)^{3/2}}$$

We now define $$u = A_{oo} a^2/x^2 \tag{A-5}$$
$$G = A_{oo} a^2/b^2,$$

where $A_{oo}$ is defined in Equation A-2 for the long coil. We no longer have $u = A$, however. We now have $$B \sim A = (u + 2G)/(1 + G/u)^{3/2} \tag{A-6}$$

We still have $dS \sim B^2 du/u^2$, giving
$$f(A)dA = dS = u(u + 2G)^2 du/(u + G)^3 \tag{A-7}$$

As an example, if the borehole diameter is half the coil length and $A_{oo} = 1.6$ is the cutoff rate at the edge of the borehole for a long coil system with the same winding cross section and current as the short coil, Equation A-2 gives G = 0.4, and Equation A-6 gives $A_o = 1.72$. It may at first be surprising that the near field of a short line dipole is greater than that of a long one. However, the field from the more distant part opposes that from the part near the $z = 0$ plane.

All specific embodiments of the invention have been described in detail, and it should be understood that the invention is not limited thereto as many variations will be readily apparent to those skilled in the art, e.g., instead of a function generator, other circuitry can be used to provide gradual onset of polarizing field build-up, and the choice would be determined by what is convenient to implement. For instance, $1/\omega$ for ordinary 60 Hz power is 2.65 ms. Hence, 60 Hz rectification provides an appropriate time constant for turn-on voltage build-up in accordance with the present invention. The build-up time could be one-half cycle, namely, 8.3 ms, say 6 or 7 ms. However, it would be important for the connection of the NML polarizing coil to the rectified 60 Hz power to be within a few degrees of the zero crossing of the 60 Hz voltage v. time waveform. FIG. 9 also shows that cutoff efficiency E is a dependent variable, and that the dependent variable A varies as function of the coil Q. Hence, instead of increasing the coil Q as previously indicated, it is also possible to approximately duplicate that result via manipulation of the dimensionless parameter A. This could be achieved by increasing the breakdown voltage of the pair of Zener diodes 64 and 69 of FIGS. 7 and 8, respectively, to approximately initially double, then triple, and next quadruple that associated with the higher Q coil circuit so that the amplitude of oscillations during ringing would double. Result: onset of precession will occur as previously described. It should be noted that while the present invention dictates that the contacts of switch 45 of FIG. 2 connecting resistance element 43 in circuit with the coil 35 be open during polarization to maximizing the driving voltage to the polarizing coil 35, the amount may in some cases be so small as to be unimportant. Moreover, if the resistive element 43 is in series with capacitor 44, no loss in power can occur during polarization irrespective of the condition of the switch 45.

TABLE 1

```
 0: dsp "Residual polarization after normal cutoff and
    cycles of sham"
 1: dso "polarization. Included are subroutines to
    approximate components"
 2: dsp "of residual polarization for Q=√2,2,4, and 8."
 3: dsp "Tape 18, files 11, Oct. 4, 1984"; gto "CALC"
 4: "F√2": cos(4.308−1.066X)→S; if X<2.7;
    cos(1.97 sin(.863X))→S
 5: −.14→M; if X>1.14; X−1.27→M; if X>2.4; (X+1)/3→M
 6: √(1−SS)→P; LP sin (M)→N; LP cos (M)→M; ret
 7: "F2": if A<.56; ret cos(2.23A)
 8: ret cos(1.235+.8 sin(2.314A−1.284))
 9: "F4": if A<.37; ret cos(4.11A)
10: ret cos(1.52+.76 sin(4.76A−1.76))
11: "F8": if A<.19; ret cos(8.06A)
12: ret cos(1.53+(.73+(A<.56).32) sin(8.79A−1.67))
13: "CALC": wtb 6,13,8,8,8,8,8,8,8,8,8,8,8; fmt 5x,z; wrt
    6; wtb 6,27,77; fmt
14: for G=0 to .4 by .4; 0→r1→r2→r3→r4→r5→r6→r7→
    r8→r9→R
15: 0→r11→r12→r13→r14→r15→r16→r17→r18→r19
16: wrt 6, "POLARIZATION DISPERSAL BY CYCLES OF VARIOUS
    Q's"
17: rad; wtb 6,10; fmt "G=",F4.2, "=Cutoff A",/; wrt 6,G
18: fmt "A", 8x, "Sig W WX WY WZ WXY WXZ WYZ
    WXYZ"
19: wrt 6; wtb 6,10; fmt f4.2,2x,9f7.0
20: for A=.01 to 3.5 by .01;A(A+2G)^2/(A+G)^3→L; A√L→X;
    C11 F√2'; 'F2' (X)→T
21: 'F4'(X)→U; 'F8'(X)→V; L+R→R ; M+r1→r1; N+r11→
    r11;MS+r2→r2; NS+r12→r12
22: r3+MST→r3; r13+NST→r13; r4+MSU→r4; r14+NSU→r14
23: r5+MSV→r5; r15+NSV→r15
24: r6+MSTU→r6; r16+NSTU→r16; r7+MSTV→r7; r17+NSTV→r17
25: r8+MSUV→r8; r18+NSUV→r18; r9+MSTUV→r9; r19+NSTUV→r19;
    if Amod.1; gto +4
26: r1^2+r11^2→Z; 1000√Z/R→Q; for I=1 to 9;
    1000(r1rI+r11r(I+10)/Z→r(I+20)
27: next I; wrt 6,Z,Q,r22, r23, r24, r25, r26, r27, r28,
    r29
28: if not Amod.5; wtb 6,10
29: next A; fmt; wtb 6,10,10
30: fmt; wrt 6, "Tuning: Exact (for high Q)";
    wtb 6,10,10
31: wrt 6, "W: Q=√2 X: Q=2 Y: Q=4 Z: Q=8; wtb 6,12; next
    G *4551
```

TABLE 2

POLARIZATION DISPERSAL BY A SHAM CYCLE HAVING CUTOFF AT VARIOUS Q's

G = 0.00 = Falloff A (Long Coil)

| A | Sig | W | WW | WY | WZ | WWZ | WXZ | WYZ | WXYZ |
|---|---|---|---|---|---|---|---|---|---|
| 0.10 | 93 | 992 | 984 | 947 | 882 | 816 | 812 | 787 | 777 |
| 0.20 | 176 | 970 | 942 | 807 | 409 | 402 | 397 | 369 | 359 |
| 0.30 | 256 | 935 | 876 | 609 | −54 | −33 | −17 | 61 | 75 |
| 0.40 | 332 | 889 | 795 | 391 | −318 | −256 | −210 | 5 | 20 |
| 0.50 | 402 | 834 | 705 | 198 | −366 | −283 | −223 | 38 | 31 |
| 0.60 | 466 | 772 | 613 | 55 | −253 | −199 | −159 | 20 | 21 |
| 0.70 | 524 | 706 | 525 | −32 | −127 | −119 | −111 | −27 | 10 |
| 0.80 | 575 | 637 | 447 | −72 | −52 | −77 | −90 | −52 | 8 |
| 0.90 | 618 | 569 | 379 | −80 | −28 | −59 | −76 | −51 | 8 |
| 1.00 | 656 | 502 | 324 | −72 | −28 | −51 | −63 | −43 | 7 |
| 1.10 | 687 | 437 | 282 | −63 | −25 | −44 | −55 | −37 | 6 |
| 1.20 | 713 | 377 | 250 | −60 | −18 | −40 | −50 | −30 | 4 |
| 1.30 | 733 | 321 | 227 | −65 | −16 | −35 | −45 | −28 | 4 |
| 1.40 | 749 | 270 | 212 | −75 | −26 | −29 | −36 | −33 | 7 |

TABLE 2-continued
POLARIZATION DISPERSAL BY A SHAM CYCLE HAVING CUTOFF AT VARIOUS Q's G = 0.00 = Falloff A (Long Coil)

| A | Sig | W | WW | WY | WZ | WWZ | WXZ | WYZ | WXYZ |
|---|---|---|---|---|---|---|---|---|---|
| 1.50 | 760 | 224 | 202 | −85 | −40 | −22 | −27 | −41 | 10 |
| 1.60 | 768 | 182 | 195 | −91 | −47 | −17 | −23 | −44 | 11 |
| 1.70 | 772 | 145 | 191 | −89 | −40 | −17 | −21 | −40 | 10 |
| 1.80 | 775 | 112 | 188 | −80 | −25 | −21 | −19 | −41 | 9 |
| 1.90 | 775 | 83 | 186 | −66 | −12 | −24 | −16 | −44 | 8 |
| 2.00 | 774 | 58 | 183 | −51 | −9 | −24 | −14 | −43 | 7 |
| 2.10 | 771 | 36 | 180 | −38 | −16 | −20 | −17 | −36 | 9 |
| 2.20 | 768 | 18 | 176 | −29 | −24 | −17 | −22 | −30 | 12 |
| 2.30 | 763 | 3 | 171 | −23 | −28 | −14 | −25 | −27 | 13 |
| 2.40 | 758 | −9 | 166 | −21 | −27 | −14 | −24 | −25 | 13 |
| 2.50 | 753 | −17 | 159 | −21 | −24 | −13 | −21 | −23 | 13 |
| 2.60 | 748 | −22 | 153 | −19 | −23 | −12 | −20 | −22 | 13 |
| 2.70 | 744 | −22 | 147 | −15 | −22 | −12 | −20 | −21 | 12 |
| 2.80 | 740 | −19 | 142 | −9 | −19 | −10 | −17 | −18 | 14 |
| 2.90 | 735 | −13 | 139 | −3 | −12 | −8 | −11 | −14 | 16 |
| 3.00 | 731 | −5 | 138 | 1 | −6 | −5 | −6 | −11 | 17 |
| 3.10 | 725 | 6 | 140 | 1 | −5 | −5 | −5 | −10 | 17 |
| 3.20 | 718 | 18 | 144 | −3 | −11 | −8 | −8 | −7 | 18 |
| 3.30 | 711 | 30 | 149 | −11 | −19 | −13 | −11 | −1 | 20 |
| 3.40 | 702 | 43 | 156 | −18 | −22 | −15 | −11 | 2 | 20 |
| 3.50 | 692 | 54 | 163 | −25 | −18 | −12 | −11 | 1 | 20 |

Tuning: Exact (for high Q)
W: Q = √2  X: Q = 2  Y: Q = 4  Z: Q = 8

TABLE 3
POLARIZATION DISPERSAL BY CYCLES OF VARIOUS Q's

G = 0.04 = Falloff A (Short Coil)

| A | Sig | W | WW | WY | WZ | WWZ | WXZ | WYZ | WXYZ |
|---|---|---|---|---|---|---|---|---|---|
| 0.08 | 83 | 994 | 989 | 939 | 789 | 784 | 776 | 747 | 735 |
| 0.19 | 189 | 970 | 941 | 778 | 315 | 309 | 303 | 276 | 266 |
| 0.31 | 293 | 927 | 861 | 557 | −181 | −152 | −134 | −33 | −14 |
| 0.42 | 389 | 868 | 759 | 325 | −421 | −344 | −298 | −51 | −33 |
| 0.54 | 473 | 799 | 650 | 133 | −427 | −329 | −273 | 7 | −0 |
| 0.65 | 547 | 724 | 545 | 3 | −283 | −222 | −186 | −2 | −2 |
| 0.76 | 609 | 646 | 451 | −66 | −149 | −139 | −129 | −41 | −7 |
| 0.87 | 660 | 568 | 371 | −90 | −77 | −97 | −102 | −58 | −5 |
| 0.98 | 703 | 493 | 309 | −88 | −53 | −78 | −85 | −52 | −3 |
| 1.09 | 736 | 422 | 261 | −76 | −45 | −66 | −72 | −44 | −3 |
| 1.19 | 763 | 356 | 227 | −67 | −33 | −58 | −65 | −37 | −3 |
| 1.30 | 783 | 296 | 204 | −68 | −20 | −53 | −61 | −29 | −4 |
| 1.40 | 797 | 242 | 190 | −77 | −18 | −47 | −55 | −26 | −4 |
| 1.51 | 806 | 193 | 181 | −90 | −30 | −39 | −44 | −34 | 1 |
| 1.61 | 811 | 151 | 176 | −101 | −46 | −29 | −34 | −43 | 5 |
| 1.72 | 814 | 113 | 173 | −106 | −54 | −23 | −29 | −46 | 6 |
| 1.82 | 813 | 80 | 171 | −104 | −46 | −23 | −27 | −43 | 6 |
| 1.92 | 811 | 52 | 169 | −95 | −31 | −26 | −25 | −43 | 5 |
| 2.03 | 808 | 27 | 168 | −81 | −19 | −29 | −21 | −45 | 4 |
| 2.13 | 803 | 6 | 165 | −67 | −16 | −28 | −19 | −44 | 4 |
| 2.23 | 798 | −11 | 161 | −55 | −21 | −25 | −21 | −39 | 6 |
| 2.34 | 791 | −24 | 156 | −47 | −26 | −22 | −24 | −34 | 8 |
| 2.44 | 784 | −34 | 151 | −42 | −28 | −20 | −25 | −31 | 8 |
| 2.54 | 778 | −40 | 145 | −39 | −27 | −19 | −24 | −30 | 8 |
| 2.64 | 773 | −43 | 139 | −36 | −27 | −18 | −23 | −29 | 8 |
| 2.74 | 768 | −41 | 133 | −30 | −28 | −17 | −25 | −29 | 6 |
| 2.84 | 762 | −35 | 130 | −22 | −29 | −17 | −25 | −28 | 5 |
| 2.95 | 757 | −26 | 128 | −13 | −24 | −14 | −21 | −24 | 8 |
| 3.05 | 751 | −16 | 129 | −5 | −15 | −10 | −13 | −19 | 11 |
| 3.15 | 744 | −3 | 132 | 0 | −7 | −5 | −7 | −16 | 12 |
| 3.25 | 736 | 10 | 137 | 0 | −6 | −5 | −6 | −15 | 13 |
| 3.35 | 727 | 23 | 144 | −4 | −12 | −9 | −9 | −11 | 14 |
| 3.45 | 717 | 36 | 152 | −11 | −19 | −15 | −11 | −6 | 16 |
| 3.55 | 706 | 47 | 159 | −17 | −22 | −17 | −11 | −3 | 16 |
| 3.66 | 694 | 57 | 166 | −22 | −19 | −14 | −11 | −5 | 16 |

Tuning: Exact (for high Q)
W: Q = √2  X: Q = 2  Y: Q = 4  Z: Q = 8

What is claimed is:

1. Method for reducing the effects of both precessing and non-precessing residual polarization in nuclear magnetic logging (NML) operations so that a series of collection cycles normalized to a common depth interval can be carried out more swiftly and accurately than in conventional NML operations, wherein the common depth interval lies within an earth formation penetrated by a wellbore adjacent to NML polarizing and detection circuitry positioned within the wellbore under control of NML computer-linked controller and recording system at the earth's surface, and wherein entrained fluids with the common depth interval are repetitively polarized with a polarizing field ($B_p$) of relatively high strength at an angle to the earth's field ($Be_e$), and after the polarizing field has been cutoff, NML signals from precessing protons of fluid nuclei within the formation are detected, comprising:

(i) Establishing a series of alternative Q values associated with integers $M_1, M_2 \ldots M_o$ where $M_1$ is 1 and $M_o$ is greater than two, for a coil circuit of the polarizing and detection circuitry, said first Q value for said coil circuit where $M_1=1$ being of a value that maximizes NML response after termination of the polarizing field ($B_p$) and ring down of said coil circuit have occurred, said $M_2 \ldots M_o$ remainder Q values each being an artificially high value greater than said first Q value and not equal to each other but wherein said $M_2 \ldots M_o$ remainder Q values also permit the coil circuit to alternately ring at higher frequencies than related to said first Q value, for aiding non-precessing components of residual polarization to precess;

(ii) Before beginning a present-in-time collection cycle, reorienting the protons of fluids of said common interval by a sham polarizing field of less strength than that of the polarizing field ($B_p$), said sham polarizing field having a slow-rising amplitude vs. time turn-on segment so as to reorient non-precessing components of residual polarization associated with the prior-in-time collection cycle about the magnetic lines of said sham polarizing field, while simultaneously scattering precessing components of said residual polarization associated with the prior-in-time collection cycle;

(iii) Terminating the sham polarizing field of step (ii) after a short duration and permitting the coil circuit to ring at one of said $M_2 \ldots M_o$ remainder Q values and generate an oscillating magnetic field that causes certain non-precessing components of the residual polarization to precess;

(iv) Repeating steps (ii) and (iii) but permitting the coil circuit to ring at another of said $M_2 \ldots M_o$ remainder Q values and generate another oscillating magnetic field that causes other non-precessing components of the residual polarization to precess;

(v) Then performing the present-in-time collection cycle wherein the polarizing field of strength ($B_p$) also has a slow-rising amplitude vs. time turn-on segment and high magnetic strength whereby final precessing components of residual polarization previously non-precessing are scattered prior to detection of the present-in-time NML signal and said logging operations can be swiftly and accurately carried out without need of a depolarization period between the present-in-time and prior-in-time collection cycles.

2. Method of claim 1 in which step (v) is further characterized by permitting the coil circuit to ring at the first Q value where $M_1$ is 1 prior to detection of the NML signal.

3. Method of claim 1 in which step (i) of establishing said $M_1 \ldots M_o$ series of alternative Q values is carried out using $M_2 \ldots M_o$ remainder Q values defining a two-numbered set wherein $M_o$ is 3.

4. Method of claim 1 in which step (i) of establishing said $M_1 \ldots M_o$ series of alternative Q values is carried out using $M_2 \ldots M_o$ remainder Q values defining a three-numbered set wherein $M_o$ is 4.

5. Method of claim 3 in which the said first Q value is about 4.0 and said remainder $M_2$ and $M_o$ Q values are equal to about 8 and 16, respectively.

6. Method of claim 1 in which step (v) is characterized by the substeps of:

(a) polarizing protons of the fluids within said common interval by the polarizing field ($B_p$), said polarizing field ($B_p$) being of a final strength that is much greater than that of said sham polarizing fields whereby final precessing components of residual polarization are scattered thereby as precession thereabout occurs, said polarizing field ($B_p$) also causing the realignxent of dipole moments of the fluid nuclei along its direction of magnetic lines and forming a nuclear polarization at an angle to the earth's field;

(b) terminating the polarizing period after a known time duration by cutting off the polarizing field at a cutoff rate, and permitting the coil circuit to ring at said first Q value, to generate a decaying oscillating magnetic field that reorients with enhanced results, the nuclear polarization associated with said polarizing field ($B_p$);

(c) detecting the precessing nuclear polarization as a present-in-time NML signal whereby the present-in-time NML signal is not influenced by the residual polarization of the prior-in-time collection cycle and logging operations can be swiftly and accurately carried out without need of a depolarization period between the present-in-time and prior-in-time collection cycles.

7. Method of claim 1 in which step (i) is further characterized by the substeps of:

(a) analyzing the time durations of the polarizing periods of the series of collection cycles to be normalized to a given depth interval to determine which of the prior-in-time polarizing periods is most likely to generate residual polarization that will affect the NML signal of a subsequent collection cycle;

(b) identify the subsequent collection cycle as the present-in-time cycle;

(c) positioning the polarizing and detection circuitry within the wellbore adjacent to a common depth interval, and performing steps (ii)–(iv) between at least the present-in-time and prior-in-time collection cycles of the series of collection cycles.

8. Method of claim 7 in which the establishing of the $M_1$ first Q value which maximizes NML response is characterized by the substeps of:

(a) generating a polarizing field by driving a polarizing coil and associated elements of said polarizing and detection circuitry with an electrical signal of known characteristics;

(b) cutting off the electrical signal after a predetermined time duration;

(c) permitting the coil and the associated elements to ring at a frequency associated with that of the protons of entrained fluids common to the adjacent formation to be surveyed, to generate a decaying oscillating magnetic field that propagates outwardly and reorients the nuclear polarization associated with said polarizing field of step (a) with enhanced results, said coil and associated elements defining a particular Q value during ringing;

(d) detecting an NML signal due to precession of said nuclear polarization of step (c) about the earth's field;

(e) repeating steps (a)–(d) using different Q values until the detected NML signal is maximum, whereby said final quality value of the coil circuit that enhances said polarization during ring down, is said $M_1$ first Q value.

9. Method of claim 8 in which the establishing of the $M_2 \ldots M_o$ remainder Q values of step (i) is further characterized by the additional substep of:

(f) mathematically establishing said $M_2 \ldots M_o$ remainder Q values based on the determined value of said $M_1$ first Q value by successive multiplications of said $M_1$ first Q value by a factor $2^n$ where n is successive equal to 1, 2 ... $(M_{o_o} - 1)$.

10. Method of claim 9 in which $M_o$ is three and the $M_2 \ldots M_o$ remainder Q values of step (f) are defined by successive increases of the $M_1$ first Q values in a range of 2Q to 4Q where Q is equal to said $M_1$ first Q value.

11. Method of claim 9 in which $M_o$ is four and the $M_2 \ldots M_o$ remainder Q values of step (f) are defined by successive increases of the $M_1$ first Q value in a range of 2Q to 8Q where Q is equal to said $M_1$ first Q value.

12. Method of claim 8 in which said coil and its elements used to establish said $M_1$ first Q value are connected in circuit with each other so as to also provide said $M_2 \ldots M_o$ remainder Q values during said present-in-time cycle and said sham polarizing cycles and comprise resistive means in one of (i) series connection and (ii) parallel connection with a capacitor parallel to said resistance element, said coil and its elements having values alternatively defining said $M_1$ first Q value and then said $M_2 \ldots M_o$ remainder Q values.

13. Method of claim 12 in which said coil and its elements are connected in a series configuration wherein said resistive means is in series with said capacitor and wherein said capacitor and said resistive element are parallel with said coil.

14. Method of claim 13 wherein said $M_2 \ldots M_o$ remainder Q values associated with said sham polarizing cycles are established by alternately decreasing the resistance value of said resistive means in separate steps, from an initial value previously used to establish the Q value for maximum NML response, to a series of lower resistance values associated with said $M_2 \ldots M_o$ remainder Q values.

15. Method of claim 12 in which said coil and its elements are connected in a parallel configuration wherein said resistive means is in parallel with said capacitor and said coil.

16. Method of claim 15 wherein said $M_2 \ldots M_o$ remainder Q values associated with said sham polarizing cycles are established by alternately increasing the resistance value of said resistive means in separate steps, from an initial value previously used to establish the Q value for maximum NML response, to a series of higher resistance values.

17. Method for reducing the effects of both non-precessing and precessing residual polarization in nuclear magnetic logging (NML) operations associated with a common depth interval in an earth formation that uses repetitive enhancement of the prior reoriented dipole moments of protons of fluids in the formation adjacent to a wellbore penetrating the formation wherein during each collection cycle, a portion of the collapsing polarizing field ($B_p$) after cutoff, is used to reorient said moments relative to the earth's field ($B_e$) using a coil circuit of a polarizing and detection circuit positioned within the wellbore under control of computer-linked controller and recording system at the earth's surface, said coil circuit being caused to ring by said collapsing field and generate an oscillating decaying magnetic field to favorably positioned said moments at an angle to the earth's field ($B_e$) so that after precession of the moments about the earth's field and generation of detectable NML signals have occurred, operations can be carried out more swiftly and accurately than in conventional NML operations, comprising:

(i) establishing a series of alternative Q values associated with integers $M_1, M_2 \ldots M_o$ where $M_o$ is greater than two, for said coil circuit during generation of alternate oscillating magnetic fields due to the collapse of either the polarizing field ($B_p$) or of a sham polarizing field ($S_p$), said $M_1$ first Q value for said coil circuit being of a value that maximizes NML response after termination of the polarizing field ($B_p$) and ring down of said coil circuit have occurred, said $M_2 \ldots M_o$ remainder Q values each being an artificially higher value greater than said $M_1$ first Q value and not equal to each other but wherein said $M_2 \ldots M_o$ remainder Q values also permit the coil circuit to alternately ring at higher frequencies than related to said $M_1$ first Q value after termination of the sham polarizing field ($S_p$) and ring down of said coil have both occurred, for aiding non-precessing components of residual polarization to precess;

(ii) positioning the polarizing and detection circuit that includes said coil circuit within the wellbore adjacent to a common depth interval of interest;

(iii) repetitively operating said polarizing and detection circuit including generating in sequence a series of sham fields and a present-in-time polarizing field of strength ($B_p$) wherein each field has slow-rising amplitude vs. time turn-on segment and permitting ring down of said coil after the cutoff of each field at one of the series of alternative Q values associated with said coil circuit, so as to produce and detect NML signals associated with a series of collection cycles having known polarizing periods but wherein the effects of residual polarization have been minimized so that logging operations can be swiftly and accurately carried out without need of a depolarization period between any of the collection cycles.

18. Method of claim 17 in which step (iii) includes the substeps (a) repetitively polarizing protons of fluids with said common interval by a polarizing field ($B_p$) to define a series of collection cycles that includes a prior-in-time and a present-in-time collection cycle wherein during each cycle, said dipole moments of the nuclei are realigned relative to the earth's field, said realigned dipole moments generating in turn nuclear polarization at an angle to the earth's field;

(b) terminating each polarizing period after a known time duration by cutting off theI polarizing field, whereby a portion of the collapsing polarizing field causes said polarizing coil and associated elements including the coil circuit to ring at said $M_1$ first Q value and generate an oscillating magnetic field that affects and enhances said polarization of step (a);

(c) between said prior-in-time and said present-in-time collection cycle, repetitively reorienting protons by an $M_2 \ldots M_o$ series of sham polarizing fields where $M_o$ is greater than two, said sham fields each having a slow-rising amplitude vs. time turn-on segment to scatter precessing components of residual polarization associated with the prior-in-time cycle;

(d) terminating each sham polarizing field and permitting the coil circuit to ring with a different one of the $M_2 \ldots M_o$ remainder Q values and generate an oscillating magnetic field that causes previously non-precessing components of the residual polarization associated with said prior-in-time cycle, to precess about the earth's field.

19. Method of claim 17 in which step (i) is further characterized by the substeps of:

(a) analyzing the time durations of the polarizing periods of the series of collection cycles to be normalized to a given depth interval to determine which of the prior-in-time polarizing periods is most likely to generate residual polarization that will affect the NML signal of a subsequent collection cycle (b) generating a polarizing field having a known time duration by driving a polarizing coil of said polarizing and detection circuitry with an electrical signal of known characteristics;

(c) cutting off the electrical signal after the time duration of step (a) has elapsed;

(d) permitting the coil and associated elements to ring at a frequency related to the proton precession frequency of entrained fluids common to the adjacent formation to be surveyed, to generate a decaying oscillating resonant magnetic field that propagates outwardly and reorients the nuclear polarization associated with said polarizing field of step (b) with enhanced results, said coil and associated elexents defining a particular Q value during ringing;

(e) after the elapse of a short time period, generating a second brief polarizing field of less strength and duration than that of step (b) but having a slow-rising amplitude vs. time turn-on characteristic so as to reorient non-precessing components of the polarization of step (d) that are residual after cession of said conventional time period;

(f) cutting off said brief field of step (e) and allowing the coil and the associated elements for the same Q of step (d) to ring and generate a second oscillating field that realigns said residual components of polarization of step (e) in an enhanced orientation relative to the earth's field;

(g) detecting an NML signal due to precession of said residual components relative to the earth's field;

(h) repeating steps (b)–(g) using different Q values until the detected NML signal due to the residual components of polarization has been minimized for a particular Q' value;

(i) mathematically establishing at least another Q' value based on said particular Q' value of step (h);

(j) alternatively electrically connecting said particular and said another Q' values for said coil circuit during alternative ringing of said circuit during said sham cycles before said present-in-time cycle whereby residual polarization due to the most likely polarizing period of step (a) will not influence present-in-time detected NML signals.

20. Method of claim 19 in which said coil and its elements of step (j) are connected in an allowable series damping configuration wherein resistive means is in series with said capacitor and wherein said capacitor and said resistive element are parallel with said coil.

21. Method of claim 20 wherein said higher Q' values of step (j) are established by decreasing the resistance value of said resistive means in steps from a value previously used to establish the Q value for maximum NML response, to at least two additional—but unequal—lower resistance values.

22. Method of claim 19 in which said coil and its elements of step (j) are connected in a parallel damping configuration wherein resistive means is in parallel with said capacitor and said coil.

23. Method of claim 22 wherein said higher Q' values of step (j) are established by increasing the resistance value of said resistive means in parallel with said capacitor in steps from that previously used to establish said Q value for maximum NML response, to higher resistance values.

24. Method of claim 17 in which the time duration of the prior-in-time residual polarization associated with said prior-in-time polarizing period that is most likely to influence a subsequent NML signal of latter in time collection cycle is such that said prior-in-time polarization period as compared to that of said present-in-time collection cycle of interest, is much longer.

25. Method of claim 17 in which said computer-linked controller and recording system at the earth's surface comprises internal improvements that enhance the detected NML signals at the end of each collection cycle of said series of cycles normalized to the same common depth interval at a rapid rate but there is no need to provide for a separate time period between collection cycles for such enhancement activity.

26. Method of claim 25 in which said improvements in said computer-linked controller and recording system include at least a single improvement chosen from the group comprising software, hardware and firmware improvements.

27. Method of claim 17 in which the slow-rising amplitude vs. time turn-on segment of said polarizing fields of step (ii) each has an instantaneous precession frequency of the precessing polarization associated with the cycle of interest.

28. Method of claim 27 in which the instantaneous frequency of rotation of the polarizing field is $\Omega$ and the instantaneous precession frequency of the polarization is $\omega$ and $\Omega << \omega$.

29. Method of claim 28 in which the ratio of $\omega$ to $\Omega$ is in a range of 10 to 100.

30. Method of claim 27 in which the amplitude of the turn-on segment is defined by the equation $$t - (1 - \exp(-\omega_o Rt))/R\omega_o \text{ where}$$

$\omega_o$ is frequency,
t is time, and
R is a dimensionless turn-on rate for voltage that drives said coil circuit within the wellbore.

31. Method of claim 15 in which step (vi) is further characterized by:

controlling the ringing of the coil circuit during each sham cycle to generate the oscillating magnetic field that propagates outwardly and causes non-precessing components of the residual polarization to precess, whereby the oscillations of the field during each sham cycle occur at higher frequencies than that of the proton resonant angular frequency ($\omega$) of the entrained fluids, and each such oscillation frequency is related to said different alternate Q' values in accordance with frequency of oscillation = $[1 - 1/(2Q')^2]^{\frac{1}{2}}$.

32. Method for reducing the effects of both non-precessing and precessing components of residual polarization in nuclear magnetic logging (NML) operations so that a series of collection cycles normalized to a common depth interval can be carried out more swiftly and accurately than in conventional NML operations, wherein the common depth interval lies within an earth formation penetrated by a wellbore adjacent to NML polarizing and detection circuitry positioned within the wellbore under control of NML computer-linked controller and recording system at the earth's surface, and wherein entrained fluids with the common depth interval are repetitively polarize with a polarizing field ($B_p$) at an angle to the earth's field ($B_e$), and after the polarizing field has been cut off, NML signals from precessing protons of fluid nuclei within the formation are detected, comprising:

(i) identifying which of the time durations of the polarizing periods of a series of collection cycles to be normalized to a given depth interval, is most likely to generate precessing residual polarization that will affect the NML signal of a subsequent collection cycle and defining the most likely period as being associated with a prior-in-time collection cycle and defining the affected subsequent cycle as the present-in-time collection cycle;

(ii) positioning the polarizing and detection circuitry within the wellbore adjacent to a common depth interval;

(iii) repetitively polarizing protons of fluids within said common interval by a polarizing field ($B_p$), said polarizing field ($B_p$) having a slow-rising amplitude vs. time turn-on segment, over at least the polarizing period associated with the present-in-time collection cycle, said repetitive polarizations defining the polarizing periods of the series of collection cycles that includes both the present-in-time collection cycle and the prior-in-time collection cycle of step (i), whereby during each collection cycle said polarizing field realigns dipole moments of the fluid nuclei and forms a nuclear polarization at an angle to the earth's field;

(iv) terminating each polarizing period after a known time duration by cutting off the polarizing field at a cutoff rate, and permitting a coil circuit of the polarizing and detection circuitry to ring at a resonant frequency related to a Q value, and generate an oscillating magnetic field that maximizes subsequent NML response;

(v) at least prior to the occurrence of the present-in-time collection cycle, reorienting the protons of the fluids, by a series of sham polarizing fields each of less strength than that of the polarizing field ($B_p$), each sham field also having a slow-rising amplitude vs. time turn-on segment for reorienting non-precessing components of residual polarization while simultaneously scattering precessing components thereof;

(vi) after each sham field has been terminated, ringing the coil circuit at a different frequency associated with a corresponding different alternate $Q'$ value of a series of $Q'$ values, each $Q'$ value of said series being greater than said Q value of step (iv) wherein during each sham cycle an oscillating magnetic field is generated causing non-precessing components of the residual polarization to precess;

(vii) detecting the precessing nuclear polarizations of the series of collection cycles as a series of NML signals, said series of collection cycles includes said present-in-time collection cycle whereby the detected NML signal associated therewith, is not influenced by either precessing or non-precessing components of residual polarization so that said logging operations can be swiftly and accurately carried out without need of a depolarization period between said next-in-time and prior-in-time collection cycles.

* * * * *